(12) United States Patent
Tikka et al.

(10) Patent No.: US 11,110,754 B2
(45) Date of Patent: Sep. 7, 2021

(54) TREAD BLOCK ARRANGEMENT HAVING A SIPE

(71) Applicant: Nokian Renkaat Oyj, Nokia (FI)

(72) Inventors: Jorma Tikka, Tampere (FI); Tomi Korkama, Tampere (FI); Outi Husso, Sastamala (FI)

(73) Assignee: Nokian Renkaat Oyj, Nokia (FI)

( * ) Notice: Subject to any disclaimer, the term of this patent is extended or adjusted under 35 U.S.C. 154(b) by 287 days.

(21) Appl. No.: 16/215,933

(22) Filed: Dec. 11, 2018

(65) Prior Publication Data
US 2019/0210410 A1 Jul. 11, 2019

(30) Foreign Application Priority Data
Jan. 5, 2018 (EP) .................................. 18397502

(51) Int. Cl.
*B60C 11/12* (2006.01)
*B60C 11/11* (2006.01)
*B60C 11/03* (2006.01)

(52) U.S. Cl.
CPC ...... *B60C 11/1281* (2013.01); *B60C 11/0302* (2013.01); *B60C 11/0306* (2013.01);
(Continued)

(58) Field of Classification Search
CPC ............ B60C 11/1263; B60C 11/1218; B60C 11/1281; B60C 2011/1213; B60C 11/1204; B60C 11/12; B60C 11/1259
See application file for complete search history.

(56) References Cited

U.S. PATENT DOCUMENTS 6,527,023 B1 * 3/2003 Takahashi ............... B60C 11/11
152/209.18
6,554,034 B1 * 4/2003 Minami ............... B60C 11/0306
152/209.22
(Continued)

FOREIGN PATENT DOCUMENTS

EP 2447091 A1 5/2012
EP 3326841 A1 11/2017
RU 2589531 C2 7/2016

OTHER PUBLICATIONS

European Patent Office, Search report of European application No. 18397502.8, dated Jun. 21 2018, 14 pages.

*Primary Examiner* — Robert C Dye
*Assistant Examiner* — Farah Taufiq
(74) *Attorney, Agent, or Firm* — Merchant & Gould P.C.

(57) ABSTRACT

A tread block arrangement suitable for a tire or for a tread band for a tire. The tread block arrangement comprises a tread block that limits a first primary sipe. The first primary sipe comprises at least a first deep part and a second deep part separated from the first deep part by a first shallow part. A depth of the first deep part is at least three times a depth of the first shallow part and a depth of the second deep part is at least three times the depth of the first shallow part. The first deep part is limited in a longitudinal direction of the first primary sipe by a primary first end wall and a secondary first end wall such that a first angle between the primary first end wall and the secondary first end wall is from 1 degree to 30 degrees. The second deep part is limited in a longitudinal direction of the first primary sipe by a primary second end wall and a secondary second end wall such that a second angle between the primary second end wall and the secondary second end wall is from 1 degree to 30 degrees.

18 Claims, 10 Drawing Sheets

(52) U.S. Cl.
CPC ............... *B60C 11/11* (2013.01); *B60C 11/12* (2013.01); *B60C 11/1204* (2013.01); *B60C 11/1218* (2013.01); *B60C 11/1236* (2013.01); *B60C 11/1263* (2013.01); *B60C 2011/0358* (2013.01); *B60C 2011/0388* (2013.01); *B60C 2011/1209* (2013.01); *B60C 2011/1213* (2013.01); *B60C 2011/1227* (2013.01); *B60C 2011/1268* (2013.01); *B60C 2011/1286* (2013.01)

(56) References Cited

U.S. PATENT DOCUMENTS

| | | | |
|---|---|---|---|
| 2006/0118221 A1* | 6/2006 | Tsubono | B60C 11/1218 152/209.18 |
| 2012/0103492 A1* | 5/2012 | Knispel | B60C 11/1263 152/209.21 |
| 2017/0136830 A1 | 5/2017 | Kuwano | |

* cited by examiner

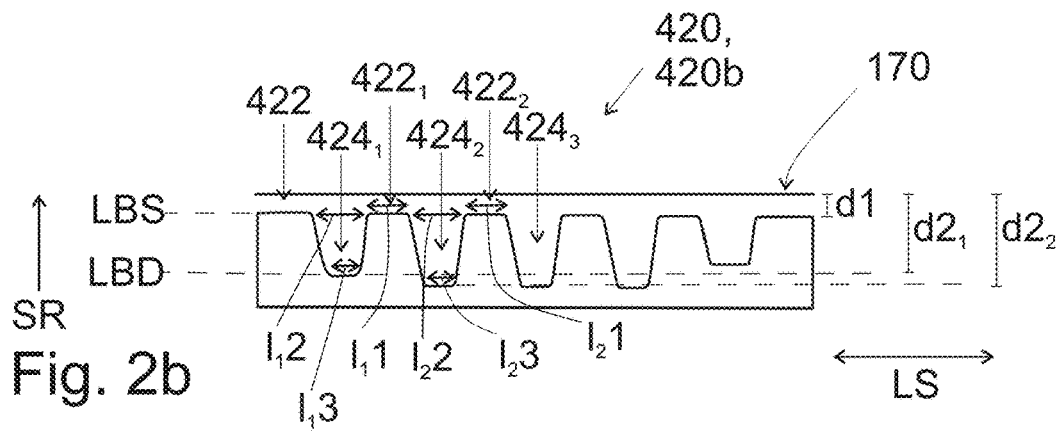
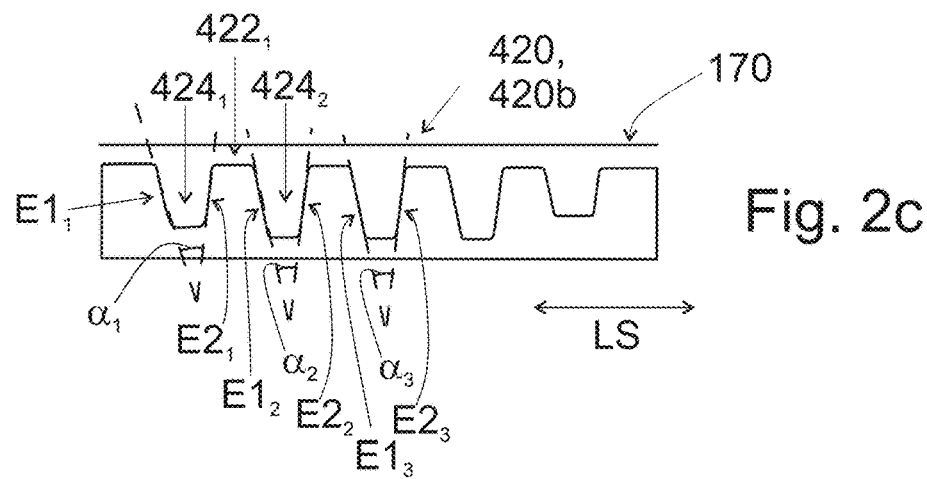
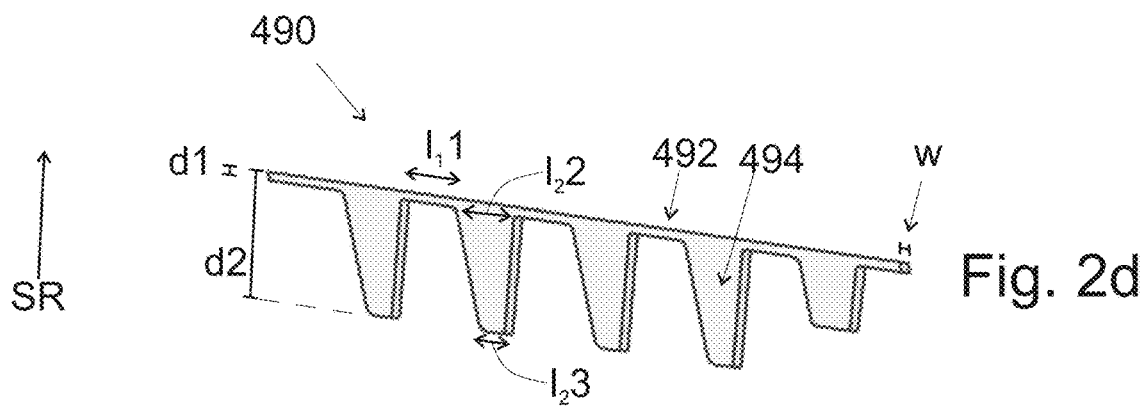
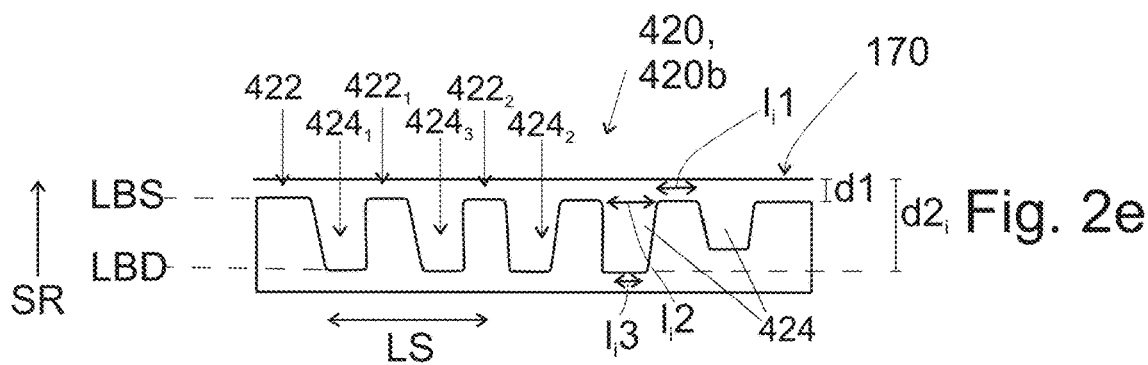

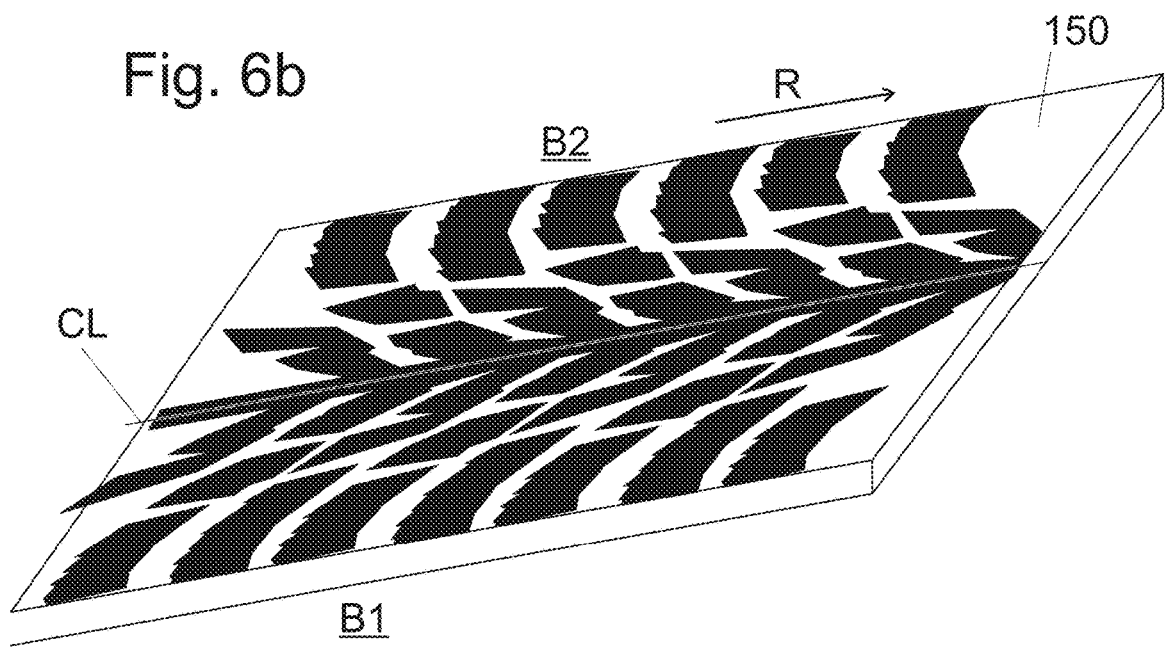
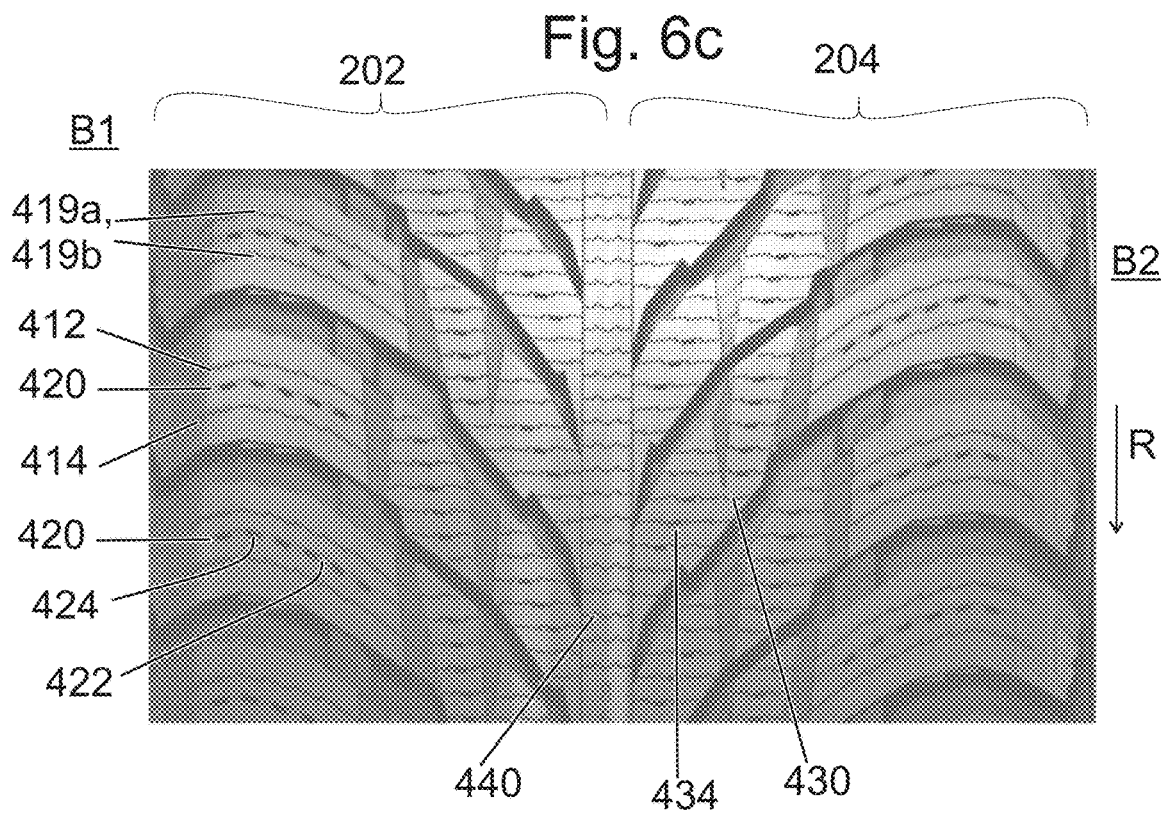

TREAD BLOCK ARRANGEMENT HAVING A SIPE

PRIORITY

This application claims priority of EP Patent Application No. 18397502.8, filed on 5 Jan. 2018 the content of which is incorporated herein by reference.

TECHNICAL FIELD

The present invention relates to a pneumatic tire or a tread band having tread blocks, and being provided in the tread blocks with sipes, more particularly to an improved sipe structure or sipe arrangement of a tread block. The present invention also relates to a lamella plates that are used in the manufacturing process of a pneumatic tire for making said sipe structure or sipe arrangement.

BACKGROUND

A tread of a known pneumatic tyre is indicated in FIG. 1a. A pneumatic tire is known to include a tread which has circumferential and transversal grooves on its outer surface, said grooves defining a number of protruding parts, such as ribs and tread blocks. The tread is meant for a rolling contact against a ground surface, such as road. The grooves are meant for draining water and/or slush that is possibly located on the ground surface away from the tread, so that the contact between the tread and the ground surface is as good and consistent as possible. Certain types of tires such as winter tires are provided in the tread with a number of sipes at various angles with respect to a motion direction of the tire. The sipes not only serve a better tire-ground contact in rain, but also improve traction, braking and lateral stability on snow by trapping snow as well as providing more gripping edges. The sipes also make the rubber material to deform more easily, in effect making the tire appear softer. This also improves friction.

Tires with sipes are known from EP2447091, U.S. Pat. No. 6,527,023, and US2017/0136830. These documents disclose tires with sipes that have a varying depth.

SUMMARY

An object of the invention is to improve the properties of a pneumatic tire provided with lamellas and sipes in the tread block so that lamellas can work more efficiently in the sense of improved gripping and improved stability because of the stiffness of the tread block comprising the lamellas.

Accordingly, a tread block arrangement is disclosed. The tread block arrangement is suitable for a tire or for a tread band for a tire. The tread block arrangement comprises tread blocks. A tread block limits a first primary sipe. The first primary sipe comprises deep parts separated by shallow parts. This has the effect that, because of the shallow parts, the first primary sipe does not significantly affect the stiffness of the tread block in which the first primary sipe is arranged. However, because of the deep parts, the first primary sipe may absorb some water of the surface, which improves the grip also near the first primary sipe. Moreover, to provide for sufficient stiffness, a depth of a deep part is at least three times a depth of a shallow part. Furthermore, because the first primary sipe preserves the stiffness of the tread block, it is possible to make a longer and/or a wider sipe, whereby the space for the water absorption may be increased. Each deep part is limited by two end walls, which are not parallel such that the deep part becomes longer when moving from bottom towards the tread. Thus, at least one of the end walls of the deep parts in inclined relative to a radial direction.

The invention is disclosed more specifically in the independent claim 1. The dependent claims disclose preferable embodiments. The description explains these embodiments and discloses further embodiments. The numbered examples summarize the tread block arrangements of the description.

BRIEF DESCRIPTION OF THE DRAWINGS

FIG. 2b shows, in a substantially circumferential view, a first primary sipe or a first secondary sipe having five (i.e. at least two; or at least three; or at least four) deep parts separated by shallow parts, FIG. 2c shows some measures of the first primary sipe of FIG. 2b, FIG. 2d shows a lamella plate for forming the sipe of FIGS. 2b and 2c, FIG. 2e shows, a first primary sipe or a first secondary sipe having five deep parts separated by shallow parts, FIG. 2i1 shows, as a top view, a lamella plate for forming a first primary sipe, FIG. 2i2 shows, as a side view, the lamella plate of FIG. 2i1, FIG. 6b shows, in a perspective view, a part of tread band, FIG. 6c shows, as a seen from front, a part of a tire having a tread with sipes.

DETAILED DESCRIPTION

Figure 1A:
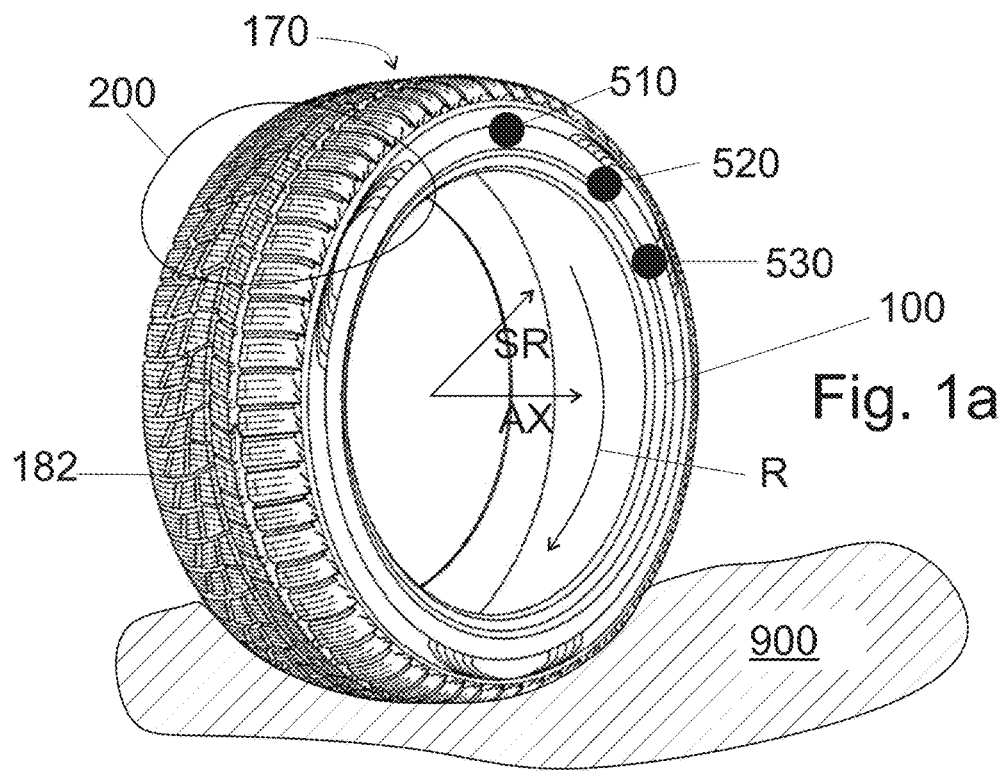
FIG. 1a shows a pneumatic tire having a tread block arrangement forming the tread of the tire, the tread block arrangement limiting a groove pattern.

FIG. 1a shows a pneumatic tire 100 having a tread block arrangement 200 forming a tread 170 of the tire 100. The tread 170 of the tire 100 (or a tread band 150) refers to the part that makes contact with the ground surface 900 (e.g. the road or the ground) when in use. The tread 170 is meant for a rolling contact against a ground surface 900. The tread 170 is the top surface of the tread block arrangement 200. The tread block arrangement comprises tread blocks 210, 220, 240, i.e. blocks, as will be detailed below.

Figure 1B:
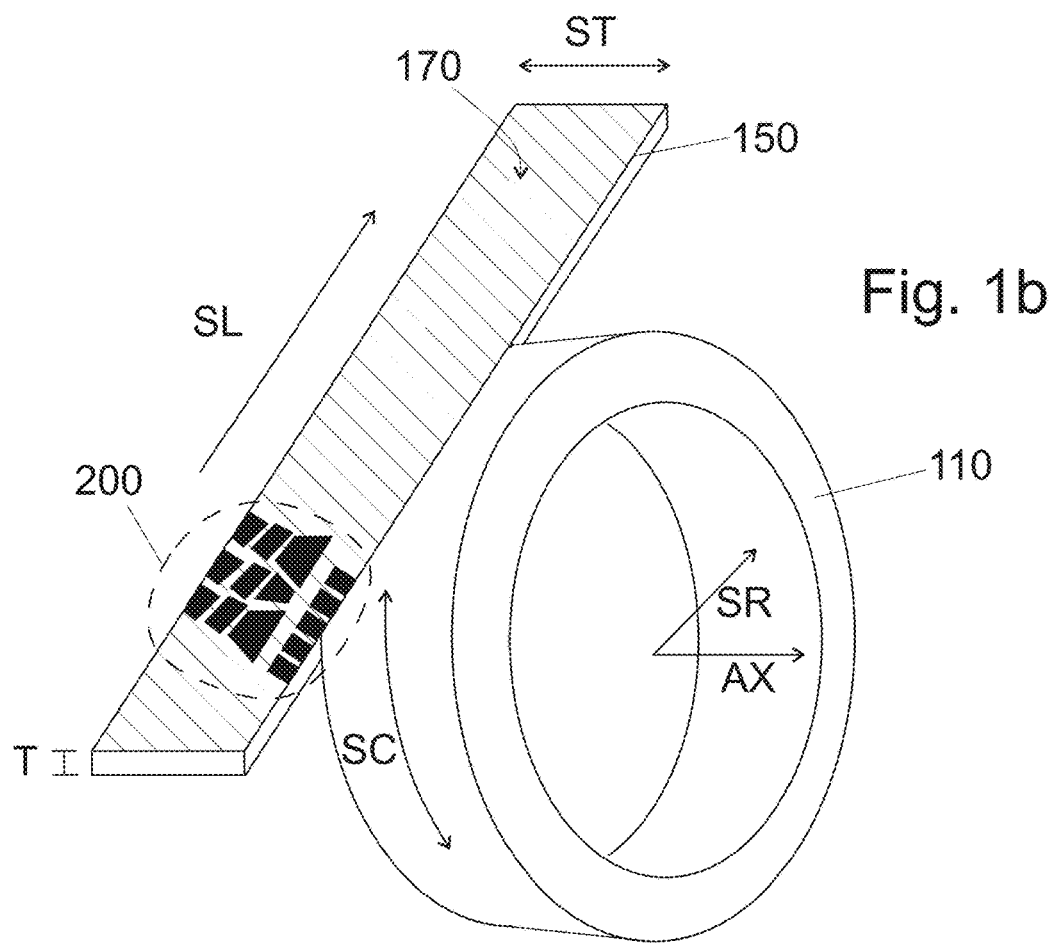
FIG. 1b shows applying a tread band onto a preform of a tire.

The direction of rotation of the tire 100 is indicated by the arrow R. The direction of rotation is parallel to a circumferential direction SC of the tire 100. The axial and radial directions of the tire 100 are indicated by the AX and SR, respectively. The tread block arrangement 200 can be formed onto the tire 100 e.g. in a moulding process. As an alternative to moulding, the tread 170 of a tire can be made by applying a tread band 150 onto a preform 110 of a tire to form the tire 100 with the tread 170. Referring to FIG. 1b, the tread band 150 may be a band extending in a longitudinal direction SL. Herein the longitudinal direction SL is perpendicular to a transversal direction ST and perpendicular to the thickness T of the tread band 150. Moreover, the band 150 is applied such that the transversal direction ST of the band is applied parallel to the axial direction AX of the tire (see FIG. 1c). Within the tire 100, the longitudinal direction SL (See FIG. 1b) of the tread block arrangement is parallel to the circumferential direction SC of the tire 100; and curves along the circumferential direction SC when the tread block arrangement 200 is on a tire. Moreover, at each point, the longitudinal direction of the tread block arrangement, i.e. the circumferential direction SC, is perpendicular to a transversal direction AX and perpendicular to the thickness T (see FIGS. 1b and 1c) of the tread block arrangement 200. The thickness T is, on a tire, substantially parallel to the radial direction SR. The tread 170 of the tread band 150 faces outwards, and forms the tread 170 of the tire 100. In this way, the tread band 150 also comprises a tread block arrangement 200 forming the tread 170.

The direction of rotation of the tire 100 is indicated by the arrow R. The direction of rotation is parallel to a circumferential direction SC of the tire. The axial and radial directions of the tire 100 are indicated by the AX and SR, respectively.

Figure 1C:
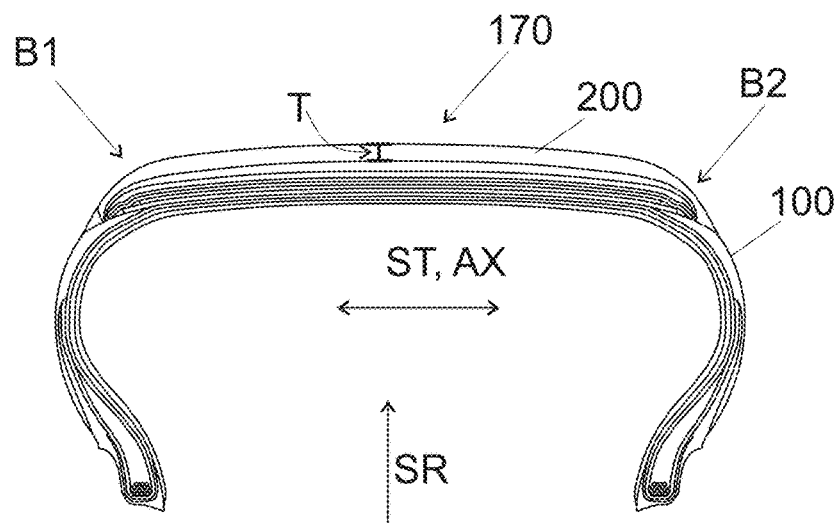
FIG. 1c shows half of a cross-section of a tire.

FIG. 1c shows a half of a cross section of the pneumatic tire 100. The tread 170 includes a primary boundary B1 and a secondary boundary B2 of the tread block arrangement 200, and the tread 170 is left in between these boundaries. The transversal direction ST is parallel to the axial direction AX. The radial direction SR is substantially parallel to a normal of a the tread 170, and parallel to the thickness T of the tread block arrangement 200 (or the tread band 150, if applicable). The circumferential direction SC is perpendicular to the plane of FIG. 1c (see also FIGS. 1a and 1b).

The longitudinal direction (SL, SC) of the tread block arrangement 200 is parallel to the longitudinal direction SL of the tread band 150 or parallel to the circumferential SC direction of the pneumatic tire 100; depending on whether the arrangement 200 is part of a tread band 150 or a pneumatic tire 100. In contrast to the direction of rotation R, the longitudinal direction (SL, SC) may refer to either of the longitudinal directions. The transversal direction (ST, AX) of the tread block arrangement 200 is parallel to the transversal direction ST of the tread band 150 or parallel to the axial direction AX of the pneumatic tire 100; depending on whether the arrangement 200 is part of a tread band 150 or a pneumatic tire 100. The thickness of the tread block arrangement 200 is parallel to the radial direction SR of the pneumatic tire 100 or the thickness of the tread band 150.

The embodiments described herein refer to an unworn tire 100 or to an unworn tread band 150. It is understood that, in use, a tire 100 wears, which may affect the depth of its sipes and/or grooves. Such an unworn tire may comprise a pattern 560 (see FIG. 8) indicative of the tire being not used. The pattern 560 may be e.g. a portion of the tread 170 having fine protrusions and/or indentations that are indicative of the tire 100 or tread band 150 being unused i.e. unworn. The unworn tire may be arranged in a storage, as opposed to being arranged on a wheel of a vehicle. Typically, a tire starts to wear as soon as it is applied onto a wheel. Thus, in an embodiment, the tire is not arranged on a wheel. Moreover, a sipe has an open top, which is open to the tread 170. In a similar manner, a groove has an open top, which is open to the tread 170. Thus, a shape of the sipe and/or groove is visible, when viewed from top.

Figure 2A:
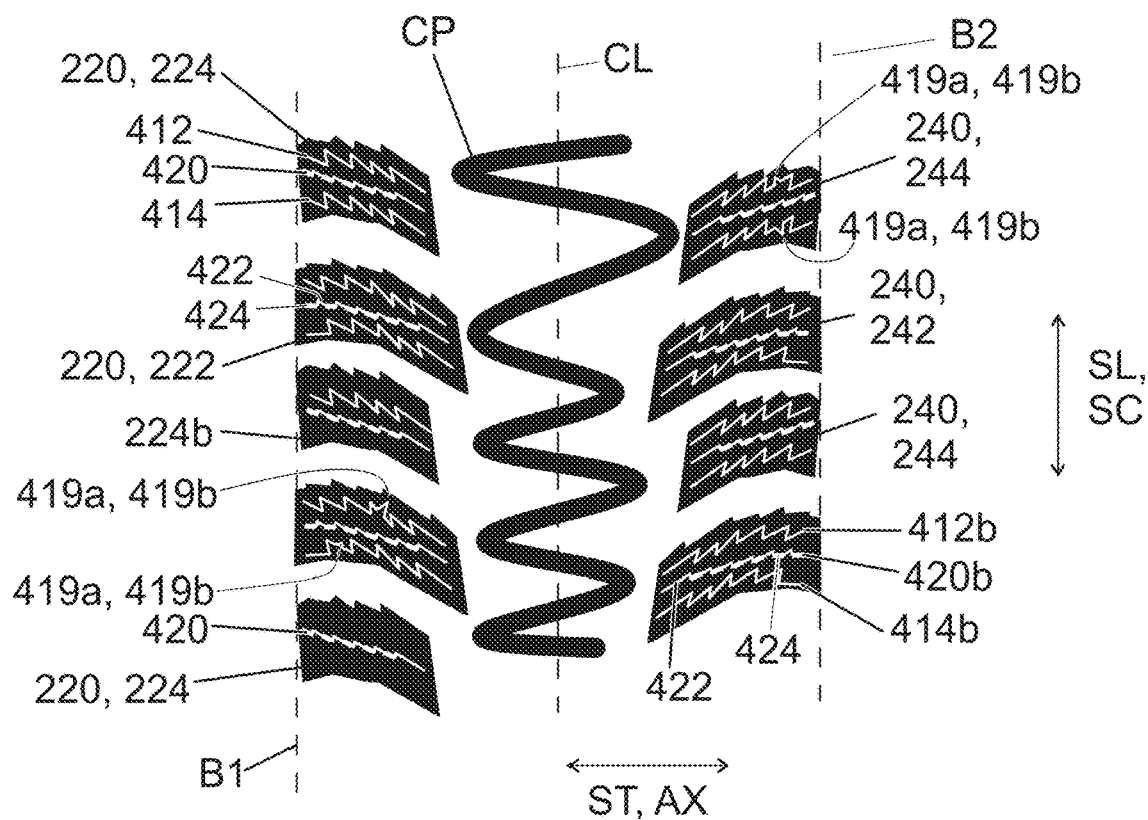
FIG. 2a shows, as a top view, a part of a tread block arrangement having sipes.
Figure 6A:
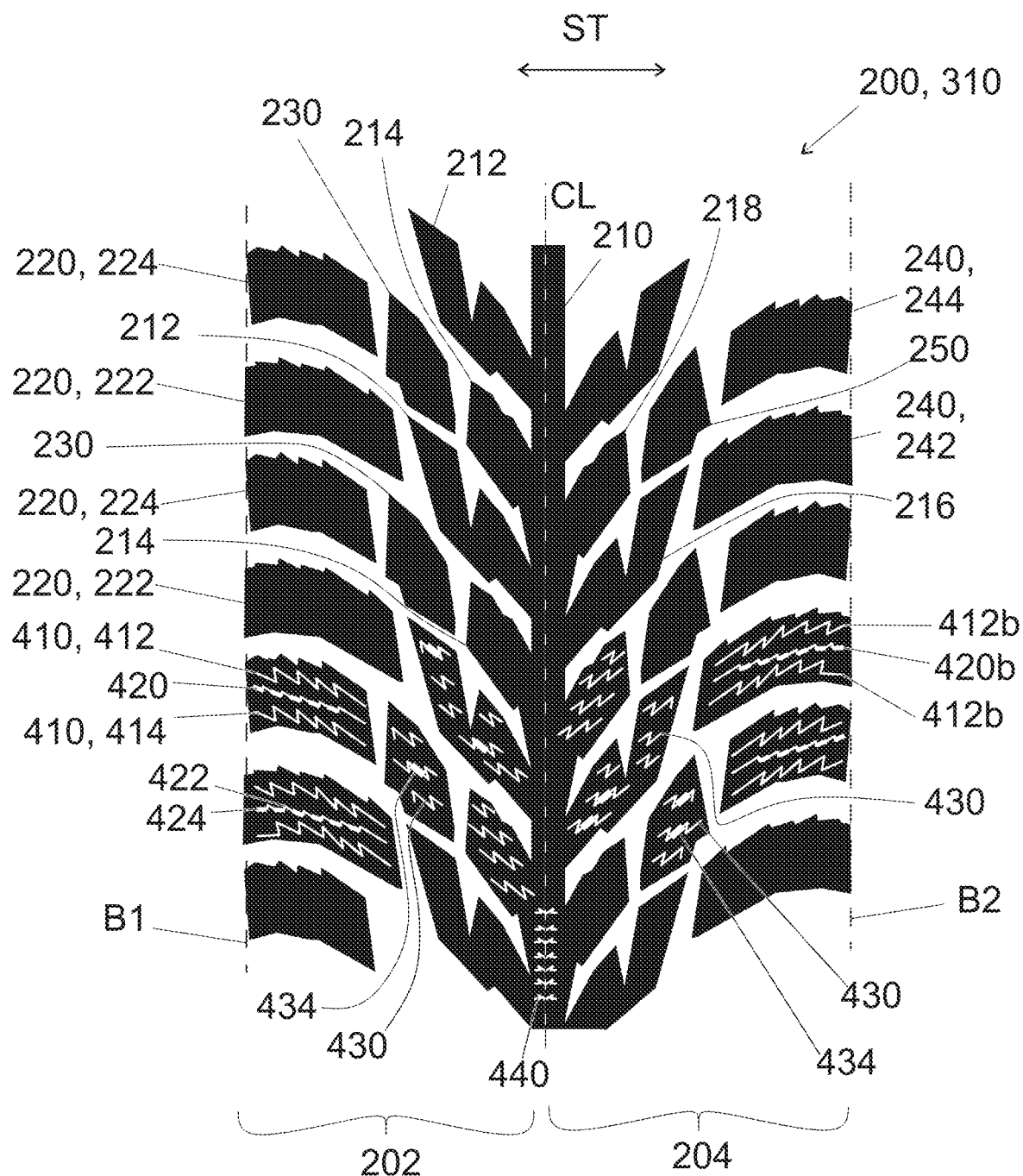
FIG. 6a shows, as a top view, a tread block arrangement with sipes.

FIG. 2a shows a tread block arrangement 200 of a pneumatic tire 100 in more detail. The tread block arrangement 200 comprises tread blocks 210, 220, 222, 224, 230, 240, 242, 244; i.e. blocks 220, 222, 224, 240, 242, 244 for short. In this description, a block refers to a tread block. Referring to FIG. 6a, a tread block arrangement 200 may comprise shoulder blocks 220, 222, 224, 240, 242, 244, a middle block 210 (with its parts 212, 214, 216, and 218) and intermediate blocks 230, 250. In this description, a block refers to a part of the tread block arrangement 200 that is separated from other blocks of the tread block arrangement 200 by a portion of a groove. As an example, the bocks 222 and 224 in FIG. 2a are separated from other blocks by a groove. In this way, a block protrudes in the radial direction SR from a bottom of the grooves. A groove has a depth and a width. The depth of a groove may be at least 6 mm, such as at least 8 mm, such as from 6 mm to 50 mm. The width of a groove may be more than 3 mm, such as more than 4 mm. The width of the groove refers to a dimension that is perpendicular to the depth and a length of the groove, wherein the length of the groove is greater than the width of the groove, and the depth is parallel to a thickness T of the tread. A width of a groove may be e.g. at most 100 mm, such as at most 20 mm. In particular, a tread block arrangement comprises primary shoulder blocks 220, 222, 224 defining a primary boundary B1 of the tread block arrangement 200 (See. FIG. 2a).

Figure 2F:
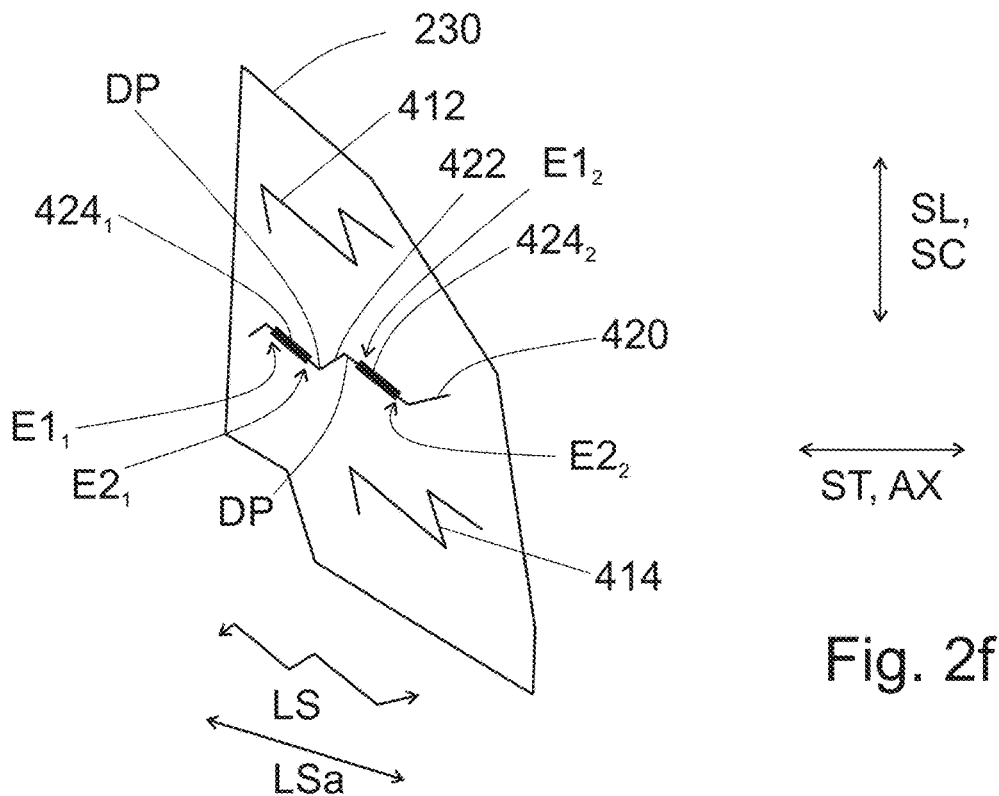
FIG. 2f shows, as seen from top, a first primary sipe having a shape of a zig-zag.

As indicated in FIGS. 2a and 2f, a tread block limits a first primary sipe 420. FIGS. 2b, 2c, 2e, 2g, and 2h show, as a substantially circumferential view, a detailed structure of a first primary sipe 420. The first primary sipe 420 extends a longitudinal direction LS of the first primary sipe 420. Moreover, the first primary sipe 420 extends in the longitudinal direction LS of the sipe 420 a longer distance than in a direction of width or depth. The longitudinal direction LS is indicated in FIGS. 2b and 2f. If the first primary sipe 420 has a shape of a zig-zag, as it may have, the longitudinal direction LS follows the shape of the sipe 420, as shown in FIG. 2f. However, an average longitudinal direction LSa can be defined to extend in between the two ends of the first primary sipe 420. As indicated by FIG. 2d, the first primary sipe 420 formable by a lamella plate 490 may have a straight shape instead of a zig-zag.

As indicated in FIG. 2a, the average longitudinal direction LSa of the sipe may be transversal or substantially transversal. For example, the average longitudinal direction LSa of the first primary sipe 420 may form an angle of at most 80 degrees with a transversal direction ST, AX of the tread block arrangement 200. The substantially circumferential view of the FIGS. 2b, 2c, 2e, 2g, 2h, 2j, 3a, 3b, 3c, and 4a is a view, in which the longitudinal direction LS of the sipe is from left to right.

As indicated in FIG. 2b, the first primary sipe 420 comprises at least a first deep part $424_1$ and a second deep part $424_2$. The first deep part $424_1$ is separated from the second deep part $424_2$ by a first shallow part $422_1$. In other words, the first shallow part $422_1$ is arranged, in the longitudinal direction LS of the first primary sipe 420, in between the first deep part $424_1$ and the second deep part $424_2$. The deep parts $424_1$ and $424_2$ are commonly denoted by the numeral 424 when considered feasible. As will be detailed, the first primary sipe 420 may comprise further deep parts 424. Thus, the first primary sipe 420 may comprise further shallow parts 422, in particular a second shallow part $422_2$. The first deep part $424_1$ is limited, in the longitudinal direction LS, by end walls $E1_1$ and $E2_1$. The second deep part $424_2$ is limited, in the longitudinal direction LS, by end walls $E1_2$ and $E2_2$. Such end walls are depicted in FIG. 2c.

Such a first primary sipe 420 has the effect that, because of the shallow part $422_1$ (or shallow parts 422), the first primary sipe 420 does not significantly affect the stiffness of the tread block, in which the first primary sipe 420 is arranged. The stiffness is not significantly affected, since the shallow part or shallow parts 422 bind the neighbouring lamellas together, whereby the stiffness remains intact. As conventional, the term "lamella" refers to the rubber material in between two sipes or in between a sipe and a groove. A lamella is typically relative thin, e.g. from 1 mm to 5 mm, the thickness referring to the distance in between the sipes (or the sipe and groove) defining the lamella. The aforementioned neighbouring lamellas are the two lamellas, in between which the first primary sipe 420 (and only the first primary sipe 420) is left. In order to have this binding effect between two neighbouring lamellas, it has been found that the depth of the deep parts 424 should be significant compared to the depth of the shallow parts 422.

In particular, a depth $d2_1$ of the first deep part $424_1$ is at least three times a depth d1 of the first shallow part $422_1$; and a depth $d2_2$ of the second deep part $424_2$ is at least three times the depth d1 of the first shallow part $422_1$. Such depths are indicated in FIG. 2b. Herein the depths d1, $d2_1$, and $d2_2$ are measured from a top surface 170 of the tread block arrangement 200, i.e. from the tread 170 of the tire 100 (see FIGS. 1c and 2b). Moreover, by definition, a sipe is an indentation or a hole within the tread. Thus, at all locations of the first primary sipe 420, its depth is more than zero. In particular, d1>0, whereby the ratio of the depths (e.g. $d2_1/d1$, which is at least 3) is always definable. In an embodiment, only the first shallow part $422_1$ is left in between the first deep part $424_1$ and a second deep part $424_2$. Correspondingly, the first and second deep parts $424_1$ and $424_2$ may be neighbouring in the sense that only one shallow part $422_1$ is left in between them. However, the first deep part $424_1$ and a second deep part $424_2$ need not be neighbouring, whereby also another shallow part $422_2$ and another deep part $424_3$ would be left in between first deep part $424_1$ and a second deep part $424_2$. Such a numbering is shown in FIG. 2e.

The stiffness is further increased, when the deep parts 424 become shorter (in the longitudinal direction LS of the sipe) at deeper level, as illustrated in FIGS. 2b, and 2e. Thus, at least one of the end walls $E1_1$ and $E2_1$ of a deep part $424_1$ is not radial. More precisely, referring to FIG. 2c, the first deep part $424_1$ is limited in the longitudinal direction LS of the first primary sipe 420 by a primary first end wall $E1_1$ and a secondary first end wall $E2_1$ such that a first angle $\alpha_1$ between the primary first end wall $E1_1$ and the secondary first end wall $E2_1$ is from 1 degree to 30 degrees, such as from 10 degrees to 20 degrees. In addition, the first angle $\alpha_1$ opens in an the outward direction, as indicated in FIG. 2c. The outward direction forms an angle of less than 90 degrees with an outward radial direction SR. The outward direction needs not to be, but may be, parallel to the radial direction SR. For example side walls of the sipe 420 may be inclined relative the radial direction SR. In addition, the second deep part $424_2$ is limited in the longitudinal direction LS of the first primary sipe 420 by a primary second end wall $E1_2$ and a secondary second end wall $E2_2$ such that a second angle $\alpha_2$ between the primary second end wall $E1_2$ and the secondary second end wall $E2_2$ is from 1 degree to 30 degrees such as from 10 degrees to 20 degrees. In addition, the second angle α2 opens in an the outward direction, as indicated in FIG. 2c. It is also noted that both the deep parts $424_1$ and $424_2$ have two end walls. Therefore, the deep parts $424_1$ and $424_2$ do not extend to the boundary of the tread block having the sipe 420. This further increases the stiffness of the tread block.

Moreover, because of the deep parts 424, the first primary sipe 420 may absorb some water, which improves the grip also near the first primary sipe 420. The ability to absorb water, as well as the stiffening effect are improved, if the deep parts 424 are even deeper compared to the shallow part(s) 422. Therefore, in an embodiment, a depth $d2_1$ of the first deep part $424_1$ is at least five times the depth d1 of the first shallow part $422_1$, and a depth $d2_2$ of the second deep part $424_2$ is at least five times the depth d1 of the first shallow part $422_1$.

In addition, the ability to absorb water, as well as the stiffening effect are improved, when the first primary sipe 420 comprises a third deep part $424_3$. Correspondingly, in an embodiment, the first primary sipe 420 comprises a third deep part $424_3$ separated from the first deep part $424_1$ or the second deep part $424_2$ by a second shallow part $422_2$. Moreover, the third deep part $424_3$ is limited in the longitudinal direction LS of the first primary sipe 420 by a primary third end wall $E1_3$ and a secondary third end wall $E2_3$ such that a third angle $\alpha_3$ between the primary third end wall $E1_3$ and the secondary third end wall $E2_3$ is from 1 degree to 30 degrees such as from 10 degrees to 20 degrees. In addition, the third angle $\alpha_3$ opens in an the outward direction, as indicated in FIG. 2c As is evident, the first primary sipe 420 may comprise a fourth deep part 424 separated from the other deep parts by a shallow part 422. More generally, the first primary sipe 420 may comprise a number N of deep parts 424 separated from each other by shallow parts 422, wherein the number N is two, at least two, three, at least three, four, at least four, five, at least five, six, at least six, seven, at least seven, eight, at least eight, or more than eight. Furthermore, preferably a depth $d2_i$ of each one of the deep parts $424_i$ (herein i=1, 2, 3, ..., N) is at least three times (or at least five times) a depth d1 of the first shallow part $422_1$.

Such a first primary sipe 420 can be manufactured by a lamella plate 490, as indicated in FIG. 2d. In the art, use of lamella plates for manufacturing sipes is well known. The lamella plate 490 is inserted into the tire 100 or tread band 150 during vulcanization of the polymer material, e.g. rubber, of the tread 170. After vulcanization, the lamella plate 490 may be removed from the tire 100 or the tread band 150. The aforementioned angles $\alpha_i$ between the end walls $E1_i$ and $E2_i$ (these were discussed above for the cases i equals 1, 2, or 3) also help the removal of the lamella plate 490 from the tire. Referring to FIG. 2d, the lamella plate 490 comprises flat parts 492 and tall parts 494. When the first primary sipe 420 is formed, the tall parts 494 of the plate 490 form the deep parts 424 and the flat parts 492 form the shallow parts 422. The flat parts 492 help to join the tall parts 494 in such a way that a single lamella plate 490 can be used to form a sipe 420 with multiple deep parts 424.

The width w of a lamella plate is indicated in FIG. 2d. The width w need not be constant. As known, the sipe 420 made with the lamella plate 490 has the same width(s) w as the lamella plate 490. In general, a width w of a deep part 424 of a sipe is less than a width of a groove of the tread block arrangement. This applies also for the present embodiments. In an embodiment, a width w of all the deep parts 424 is less than half of a width of a groove of the tread block arrangement. In an embodiment, a width w of a deep part 424 is at most 3 mm or less than 3 mm, such as less than 2 mm, e.g. at most 1.5 mm.

Referring to FIGS. 2c and 2d, in an embodiment, each one of the shallow parts 422 is equally wide. Thus, in an embodiment, each one shallow parts 422 has a width w, as indicated in FIGS. 2c, and 2d. Moreover, in an embodiment, each one of the deep parts 424 is equally wide. Thus, in an embodiment, each one deep parts 424 has a width w, as indicated in FIGS. 2c, and 2d. Moreover, in an embodiment, shallow parts 422 are as wide as deep parts 424. This has the effect that the first primary sipe 420 can be made using a lamella plate 490, which has been formed from a plate having a constant thickness. The thickness of the plate corresponds to the width w of the lamella plate 490 and the width of the first primary sipe 420. In an embodiment, a width w of all the deep parts 424 is at most 3 mm or less than 3 mm, such as less than 2 mm, e.g. at most 1.5 mm.

For these reasons, in an embodiment, a depth d1 of each one of the shallow parts 422 is from 0.1 mm to 2 mm, preferably from 0.15 mm to 1.0 mm, more preferably from 0.2 mm to 0.5 mm. The depth d1 is preferably as small as practically possible, keeping in mind that a corresponding flat part 492 of a lamella plate requires some strength to join the tall parts 494. As an example, a depth d1 of each one the shallow parts 422 may be 0.3 mm, when the lamella plate 490 is made from steel. In an embodiment, the depths $d2_1$ and $d2_2$ of both of the deep parts $424_1$ and $424_2$ are from 5 mm to 15 mm, preferably from 6 mm to 8 mm. Typically the deep parts $424_1$ and $424_2$ are somewhat shallower than the grooves. This also improves the stiffness of the tread blocks, while maintaining the water drainage properties of the grooves. As an example the depths $d2_1$ and $d2_2$ of both of the deep parts $424_1$ and $424_2$ are at most 90% of a depth of a groove of the tire. A depth of the grooves may be e.g. from 6 mm to 50 mm, such as from 6 mm to 15 mm, such as from 7 mm to 10 mm.

Still further, when the depth d1 of a shallow part 422 is very small, the shallow parts 422 of the first primary sipe 420 do not affect the grip and driving properties of a new, unworn, tire 100. However, because of easy manufacturing, a shallow part or shallow parts 422 is/are provided, in contrast to individual cavities corresponding to the deep parts 424.

Referring to FIG. 2b, in an embodiment, the first shallow part $422_1$ has a first primary length $l_11$. As indicated in FIG. 2b, the first primary length $l_11$ is parallel to the longitudinal direction LS of the first primary sipe 420. Moreover, as indicated in FIGS. 2b and 2c, the first primary length $l_11$ refers to a length of the first shallow part $422_1$ as measured at a level LBS of a bottom of the first shallow part $422_1$. In addition, the first deep part $424_1$ has a first secondary length $l_12$, which also is parallel to the longitudinal direction LS. The first secondary length $l_12$ refers to a length of the first deep part $424_1$ as measured at a level LBS of a bottom of the first shallow part $422_1$, which separates the first deep part $424_1$ from the second deep part $424_2$, provided that the first deep part $424_1$ and the first shallow part $422_1$ are next to each other, i.e. they are limited by a same interface. If these parts ($424_1$ and $422_1$) are not next to each other, the first secondary length $l_12$ refers to a length of the first deep part $424_1$ as measured at a level of a bottom of such a shallow part 422 that is next to the first deep part $424_1$; i.e. such a shallow part 422 that an interface limits both the shallow part 422 and the first deep part $424_1$.

In an embodiment, a ratio ($l_11/l_12$) of the first primary length $l_11$ to the first secondary length $l_12$ is from one third (⅓) to 3, such as from one half (½) to 2. This ratio has been found particularly suitable for the functions of the first primary sipe 420. On one hand, sufficiently long shallow parts 422 improve the stiffness, and on the other hand, sufficiently long deep parts 424 ensure that the deep parts 424 can absorb a reasonable amount of water. However, it is also possible that the first primary length $l_11$ is small. In absolute values, the first primary length $l_11$ may be e.g. from 0.3 mm to 10 mm, such as from 0.5 mm to 6 mm. Preferable lengths $l_11$ for the first shallow part include also from 2 mm to 4 mm, such as from 2.5 mm to 3.5 mm. Such lengths are beneficial for joining the two neighbouring lamellas reasonably well to each other and for providing reasonably long deep parts for absorbing water.

To enable water to be absorbed by the deep parts, the first secondary length $l_12$ should be reasonably long. Preferably, the first secondary length $l_12$ is greater than the first primary length $l_11$. Preferably, the first secondary length $l_12$ is from 2.5 mm to 5 mm, such as from 3 mm to 4 mm.

The first deep part $424_1$ has also a first tertiary length $l_13$ as measured at a level LBD of a bottom of the first deep part $424_1$. In order to bond the lamellas limiting the first primary sipe 420 strongly to each other, preferably, the deep part 424 becomes longer, when the depth of observance rises from the level LBD of the bottom of the deep part to the level LBS of the bottom of the shallow part 422 neighbouring the deep part 424. In an embodiment, the first tertiary length $l_13$ at the bottom of the first deep part $424_1$ is smaller than the first secondary length $l_12$ at the top of the first deep part. For example, the first tertiary length $l_13$ may be e.g. at most 95%, at most 90% or at most 75% of the first secondary length $l_12$.

The shape of the deep part may be triangular, whereby the first tertiary length $l_13$ may be zero. Preferable first tertiary lengths $l_13$ are e.g. from 0.1 mm to 2.0 mm, such as from 0.5 mm to 1.5 mm What has been said above of the secondary and tertiary lengths of a the first deep part $424_1$ applies to the corresponding lengths of the second deep part $424_2$ mutatis mutandis. When the sipe 420 comprises a third deep part $424_3$, the measures preferably apply also thereto mutatis mutandis. What has been said above of the primary length of a the first shallow part $422_1$ applies to the length of the second shallow part $422_2$ mutatis mutandis. What has been said about the a ratio ($l_11/l_12$) of the primary length $l_11$ of the first shallow part $422_1$ to the secondary length $l_12$ of the first deep part $424_1$ applies to the ratio ($l_21/l_22$) of the primary length $l_21$ of the second shallow part $422_2$ to the secondary length $l_22$ of the second deep part $424_2$.

Referring to FIGS. 2b and 2e, the shape of the deep parts 424 may be e.g. a trapezoid. The shape refers to a shape of a cross section of the deep parts on a plane of a side wall of the first primary sipe 420. As indicated in FIG. 2b, two sides of the trapezoid may be e.g. parallel to a plane of the tread 170, while none of the sides of the trapezoid is radial. As indicated in FIG. 2e, two sides of the trapezoid may be e.g. parallel to a plane of the tread 170, and one of the sides of the trapezoid may be radial. At least the bottom corners of the trapezoid may be rounded. However, the bottom of the deep part may be inclined, whereby the shape of the deep parts 424 may be a general polygon, e.g. a polygon with four sides or a polygon with three sides.

Figure 2G:
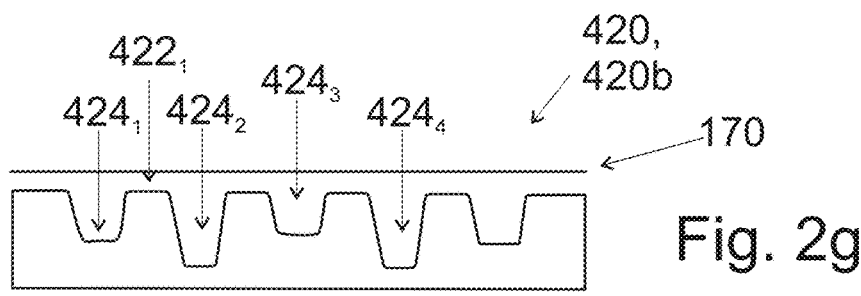
FIG. 2g shows, a first primary sipe or a first secondary sipe having deep parts that are not equally deep.

Referring to FIG. 2g, all the deep parts 424 are not necessarily equally deep. Correspondingly, in an embodiment, a depth $d2_1$ of the first deep part $424_1$ is different from a depth $d2_2$ of the second deep part $424_2$. As an example a ratio $(d2_1/d2_2)$ of the depth $d2_1$ of the first deep part $424_1$ to the depth $d2_2$ of the second deep part $424_2$ may be e.g. more than 1.1 or less than 0.9 such as more than 1.2 or less than 0.8 such as more than 1.3 or less than 0.75. By using such a configuration, the softness of the tread block limiting the first primary sipe 420 can be locally designed according to needs. The softness of the tread block limiting the first primary sipe 420 can be engineered e.g. in such a way that the stiffness of the block is higher closer to a boundary of the tread (e.g. the primary boundary B1 or the secondary boundary) than further away from it (i.e. closer to a central line CL).

Figure 2H:
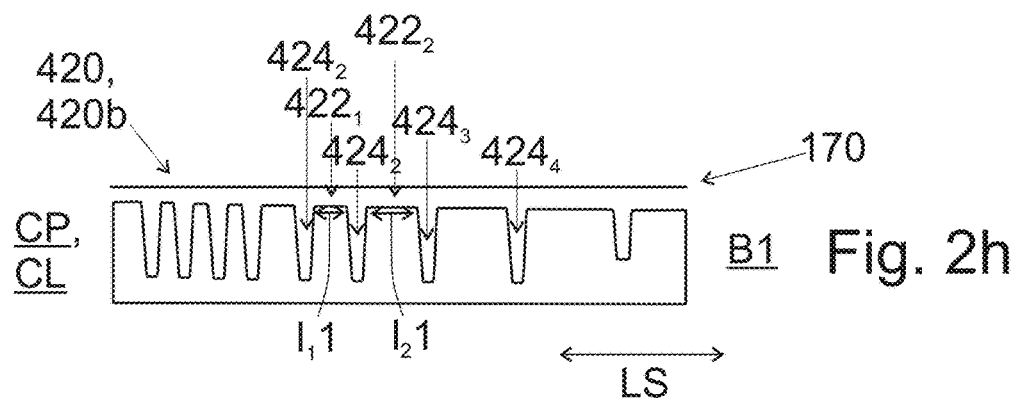
FIG. 2h shows, a first primary sipe or a first secondary sipe having deep parts that are located at distances from neighbouring deep parts, wherein the distances are not equal.
Figure 2J:
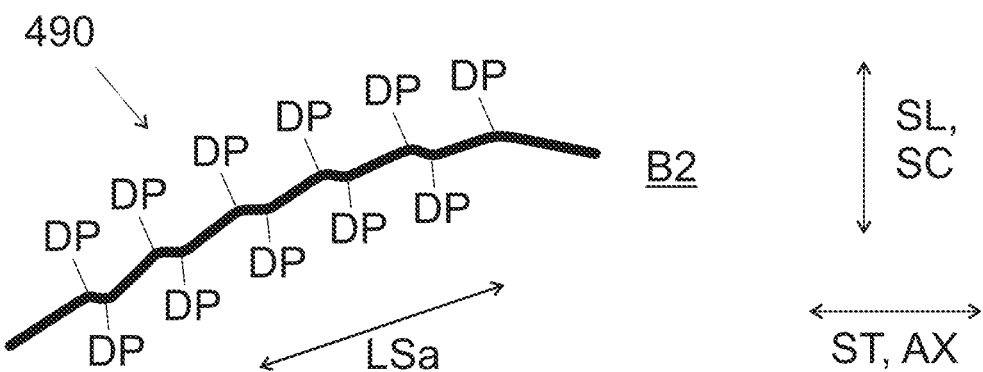
FIG. 2j shows, in a substantially circumferential view, a first primary sipe.
Figure 2J:
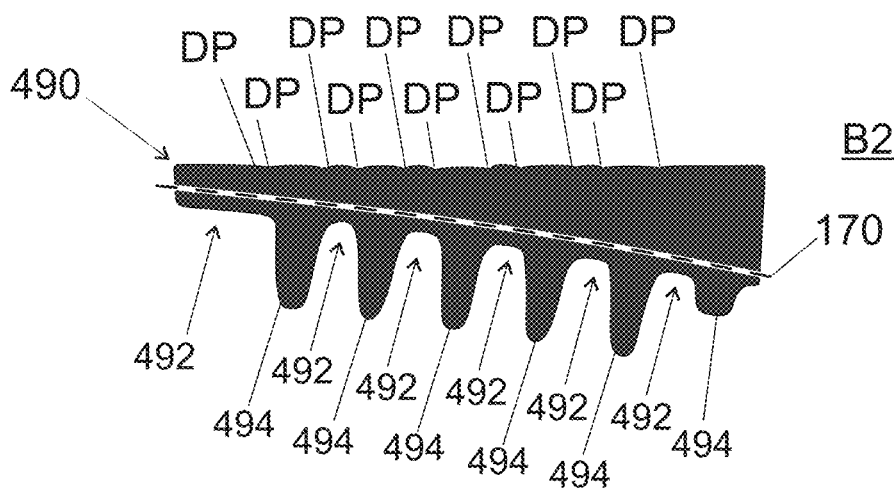
Figure 2J:
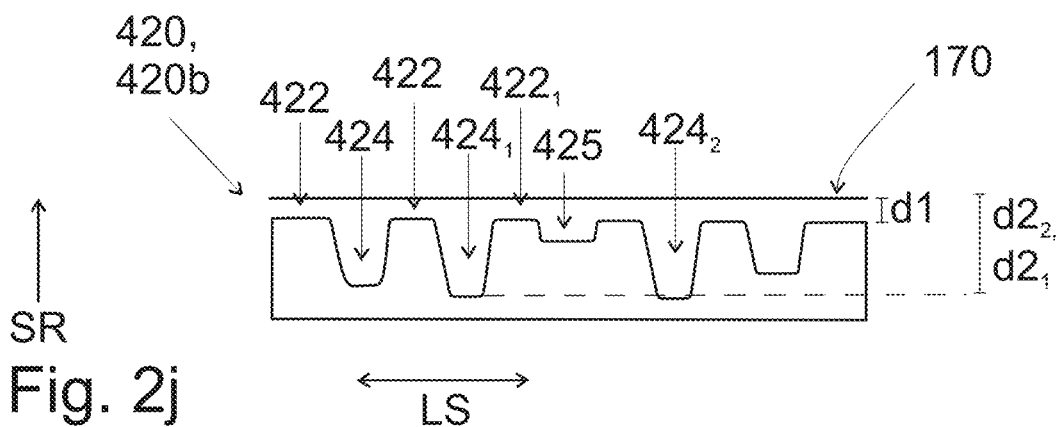

Referring to FIG. 2j it is also possible, that the first primary sipe 420 comprises the first deep part $424_1$ and the second deep part $424_2$, wherein both of them are at least five times as deep as a shallow part 422 in between them; and the first primary sipe 420 comprises a part 425 in between the first shallow part $422_1$ and one of the first deep part $424_1$ and the second deep part $424_2$, wherein a depth of the part 425 is more than the depth d1 of the first shallow part $422_1$, but not at least three or at least five times the depth $d_1$ of the the first shallow part $422_1$. Thus, a depth of all the parts 424, 425 that are deeper than the first shallow part $422_1$ need not to be at least three or at least five times as deep as the first shallow part $422_1$.

Referring to FIGS. 2a and 2f, in an embodiment, the first primary sipe 420 has a shape of a zig-zag, when viewed from top. In an embodiment, when viewed from top, the first primary sipe 420 comprises at least two deflection points DP (see FIG. 2f). Thus, the zig-zag is formed. This helps to lock the sidewalls of the first primary sipe 420 to each other, and in this way further stiffens the tread block. The corners at the deflection points DP may be rounded. This is most often due to manufacturing of the lamella plate (490, 482) by bending a plate, whereby infinitely sharp corners are not produced.

As indicated in FIG. 2f, preferably at least one of the deflection points DP is arranged at a location of the shallow part 422. This further helps to lock the sidewalls of the first primary sipe 420 to each other. All the deflection points DP may be provided at locations of the shallow parts 422. In an embodiment, no deflection point is provided at the location of the first deep part $424_1$. In such an embodiment, the first primary sipe 420 extends only straight in between the primary first end wall $E1_1$ and the secondary first end wall $E2_1$, as indicated in FIG. 2f. In an embodiment, no deflection point is provided at the location of the second deep part $424_2$. In such an embodiment, the first primary sipe 420 extends only straight in between the primary second end wall E12 and the secondary second end wall E22, as indicated in FIG. 2f. In an embodiment, when viewed from top, no deflection point DP of the first primary sipe 420 is arranged at a location of any of the deep parts 424. Also this further helps to lock the sidewalls of the first primary sipe 420 to each other.

FIG. 2i1 shows, as a top view, a lamella plate 490 for forming a second primary sipe 420b (i.e. a sipe with similar properties as a first primary sipe 420, but arranged in a secondary shoulder block near a secondary boundary B2). The lamella plate 490 is oriented relative to the circumferential direction SC and the axial direction AX as it would be, when manufacturing a tire. Thus, FIG. 2i1 also shows, as seen from top, a second primary sipe 420b. As indicated in FIG. 2i1, the second primary sipe 420b has the shape of a zig-zag. The lamella plate 490 has been bent in multiple (eleven) deflection points DP. The deflection points corresponds to deflection points of a sipe.

FIG. 2i2 shows, as a side view, the lamella plate 490 if FIG. 2i1. The lamella plate 490 is for forming a second primary sipe 420b. Typically, the tread curves near the boundary B2. The curving tread 170 is indicated by the dotted line 170. As indicated in the figure, the flat parts 492 may be reasonably tall relative to the tall parts 494, depending on how the lamella plate 490 is used. As indicated in FIGS. 2i1 and 2i2, the deflection points DP are arranged in the flat parts 492, typically at an intersection of the flat part 492 and a tall part 494. Correspondingly, all the tall parts 494 extend only straight in a longitudinal direction of the lamella plate 490. In a corresponding first primary sipe 420 or second primary sipe 420b, all the deep parts 424 extend only straight in between the end walls $E1_i$ and $E2_i$. What has been said about the second primary sipe 420b applies to the first primary sipe 420.

Referring again to FIG. 2d, it is noted that the lamella plate 490, and a corresponding first primary sipe 420 may be free from deflection points. Thus, in an embodiment, the first primary sipe 420, when viewed from top, is free from deflection points. Therefore, in an embodiment, the first primary sipe 420 extends only straight from one of its ends to another one of its ends. In a preferable embodiment, the first primary sipe 420 is provided in a shoulder block 220, 222, 224, 240, 242, 244. Referring to FIG. 2a the tread block arrangement comprises primary shoulder blocks 220, 222, 224 defining a primary boundary B1. Therefore, in an embodiment, the tread block that comprises the first primary sipe 420 defines a part of the primary boundary B1 of the tread block arrangement 200; and the tread block arrangement 200 comprises other primary shoulder blocks 220, 222, 224 defining other parts of the primary boundary B1. This has been found to be a particularly feasible location for the sipe 420, since the length (in the axial direction ST, SX or substantially axial direction) of the primary shoulder block 220, 222, 224 is reasonably large. Therefore, additional stiffness may be provided for at least those blocks by the aforementioned structure of the first primary sipe 420.

Referring to FIG. 2h, in an embodiment, the stiffness of the tread block is engineered by the first primary sipe 420 in such a way that the stiffness is higher closer to the primary boundary B1 than further away from it. Thus, in an embodiment, the tread block arrangement 200 defines a primary boundary B1, a secondary boundary, and a central part CP, as indicated in FIG. 2a. A central line CL is arranged in the middle of the two boundaries B1, B2. Moreover, the first primary sipe 420 comprises a third deep part $424_3$ separated from the first deep part $424_1$ or the second deep part $424_2$ by a second shallow part $422_2$. In the embodiment of FIG. 2h, the second shallow part $422_2$ is located closer to the primary boundary B1 than the first shallow part $422_1$, whereby the second shallow part $422_2$ is located further away from the central part CP (in particular the central line CL) than the first shallow part $422_1$. Moreover, the first shallow part $422_1$ has a first primary length $l_11$ on a level LBS of a bottom of the first shallow part $422_1$ and the second shallow part $422_2$ has a second primary length $l_21$ on a level of a bottom of the second shallow part $422_2$. Furthermore, to have a stiff area near the primary boundary B1, the second primary length $l_21$ is greater than the first primary length $l_11$. In a preferable embodiment, the tread block 220, 222, 224 that comprises the first primary sipe 420 defines a part of a primary boundary B1 of the tread block arrangement 200. In addition or alternatively, a similar sipe may be applied near the secondary boundary B2. Thus, in an embodiment, a stiffness of a tread block is engineered by a first secondary sipe 420b in such a way that the stiffness is higher closer to the secondary boundary B2 than further away from it (e.g. closer to a central line CL).

Such a sipe (i.e. sipe structure) or sipe arrangement has been found to improve handling of the tire when driving on road. In addition, the sipe or sipe arrangement has been found to increase friction, i.e. improve decelerating and accelerating the vehicle on dry and wet road. Furthermore, the sipe or sipe arrangement has been found to improve grip on an icy road.

As indicated in FIGS. 2a and 2f, a tread block limits a first primary sipe 420. Preferably, the tread block that limits the first primary sipe 420 further limits a second primary sipe 412. As also indicated in these figures, in an embodiment, the tread block that limits the first primary sipe 420 and the second primary sipe 412 further limits a third primary sipe 414. The tread block may further limit additional sipes. The tread block limiting at least the first primary sipe 420 may be a shoulder block 220, 222, 224, 240, 242, 244, an intermediate block 230, 250, or a middle block 210, or a part of any of these blocks.

If the tread block comprises at least two sipes, the first primary sipe 420 is arranged in a direction SC, SL that is perpendicular to a transversal direction ST, AX of the tread block arrangement 200 and perpendicular to the thickness T of the tread block arrangement 200 next to the second primary sipe 412, as indicated in FIGS. 2a and 2f. Thus, a single lamella limits both the first primary sipe 420 and the second primary sipe 412. Thus, only one lamella is left in between the first primary sipe 420 and the second primary sipe 412.

Moreover, because the first primary sipe 420 is arranged next to the second primary sipe 412, the increased stiffness, due to the shallow parts 422, ensures that the walls of also the second primary sipe 412 lock well to each other under acceleration or deceleration. This further improves the stiffness and grip of the tread block 220, 222, 224, in which the first primary sipe 420 and the second primary sipe 412 are arranged.

Referring to FIG. 2a, in an embodiment, the tread block that limits the first primary sipe 420 and the second primary sipe 412, limits also a third primary sipe 414. As indicated in FIG. 2a, in an embodiment, only one lamella is left in between the first primary sipe 420 and the second primary sipe 412, and only one lamella is left in between the first primary sipe 420 and the third primary sipe 414. Referring to FIGS. 6a and 6c, in an embodiment, each one of the deep parts 424 of the first primary sipe 420 is arranged in between the second primary sipe 412 and the third primary sipe 414 in a direction in a direction SC, SL that is perpendicular to a transversal direction ST, AX of the tread block arrangement 200 and perpendicular to the thickness T of the tread block arrangement 200.

The first primary sipe 420, the second primary sipe 412, and the third primary sipe 414, are transversal sipes. A transversal sipe (420, 412, 414) extends in an average longitudinal direction LSa that forms an angle of at most 80 degrees with the transversal direction ST, AX of the tread block arrangement 200. What has been said above about the longitudinal direction LS and the average longitudinal direction LSa of the first primary sipe 420 applies to also to directions of other sipes, in particular 412 and 414, mutatis mutandis.

As discussed above, preferably at least a primary shoulder block, which defines a part of a primary boundary B1, limits the first primary sipe 420. Referring to FIG. 2a, in an embodiment, a primary shoulder block 220, 222, 224 limits at least the first primary sipe 420. That primary shoulder block 220, 222, 224 may further limit the second primary sipe 412. That primary shoulder block 220, 222, 224 may further limit the third primary sipe 414. The primary shoulder block 220, 222, 224 may further limit additional sipes.

In an embodiment, at least half of the primary shoulder blocks 220, 222, 224 are provided with first primary sipes 420 as discussed above for one of the primary shoulder blocks 220, 222, 224. Thus, in an embodiment, at least half of the primary shoulder blocks 220, 222, 224 are provided with a first primary sipe 420 having the two deep parts $424_1$, $424_2$ each limited by two end walls ($E1_1$, $E1_2$, $E2_1$, $E2_2$) and separated from each other with a shallow part $422_1$, as discussed above for one tread block.

In an embodiment, all the primary shoulder blocks 220, 222, 224 are provided with first primary sipes 420 as discussed above for one or more of the primary shoulder blocks 220, 222, 224. Thus, in an embodiment, all the primary shoulder blocks 220, 222, 224 are provided with a first primary sipe 420 having the two deep parts $424_1$, $424_2$ each limited by two end walls ($E1_1$, $E1_2$, $E2_1$, $E2_2$) and separated from each other with a shallow part $422_1$, as discussed above for one tread block.

Referring to FIG. 2a, a tread 170 typically comprises also secondary shoulder blocks 240, 242, 244 defining a secondary boundary B2 such that a central line CL is left in between the primary boundary B1 and the secondary boundary B2. FIG. 2a shows the primary and secondary shoulder blocks in addition to the primary and secondary boundaries B1 and B2, and the central line CL. In addition the curved line CP denotes a central part of the tread 170 irrespective of its details. The central part CP comprises blocks. Examples of central parts are shown in FIGS. 6a to 8.

Moreover, in an embodiment, at least one of the secondary shoulder blocks 240, 242, 244 limits a first secondary sipe 420b. What has been said above about the first primary sipe 420 applies to the first secondary sipe 420b. Thus, in an embodiment, a secondary shoulder block 220, 222, 224 is provided with a first secondary sipe 420b having the two deep parts $424_1$, $424_2$ each limited by two end walls ($E1_1$, $E1_2$, $E2_1$, $E2_2$) and separated from each other with a shallow part $422_1$, as discussed above for one tread block.

Moreover, what has been said above about the second primary sipe 412 or the second and third primary sipes 412, 414 neighbouring the first primary sipe 420 applies also to secondary sipe or sipes 412b, 414b neighbouring the first secondary sipe 420b. Thus, in an embodiment, the secondary shoulder block 240, 242, 244 that limits the first secondary sipe 420b, limits a second secondary sipe 412b. Moreover, preferably only one lamella is left in between the first secondary sipe 420b and the second secondary sipe 412b. Still further, in an embodiment, the secondary shoulder block 240, 242, 244 that limits the first secondary sipe 420b, limits a second secondary sipe 412b and a third secondary sipe 414b. Moreover, preferably only one lamella is left in between the first secondary sipe 420b and the second secondary sipe 412b, and only one lamella is left in between the first secondary sipe 420b and the third secondary sipe 414b.

In an embodiment, at least half of the secondary shoulder blocks 240, 242, 244 are provided with secondary sipes (412, 414, 420), at least the first secondary sipes 420b, as discussed above for one of the secondary shoulder blocks 240, 242, 244. In an embodiment, all the secondary shoulder blocks 240, 242, 244 are provided with secondary sipes (412, 414, 420), at least the first secondary sipes 420b, as discussed above for one or more of the secondary shoulder blocks 240, 242, 244.

Figure 3A:
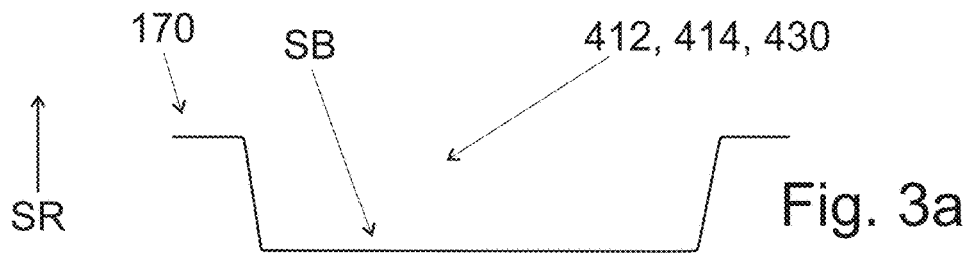
FIG. 3a shows a conventional sipe having a flat bottom.
Figure 3B:
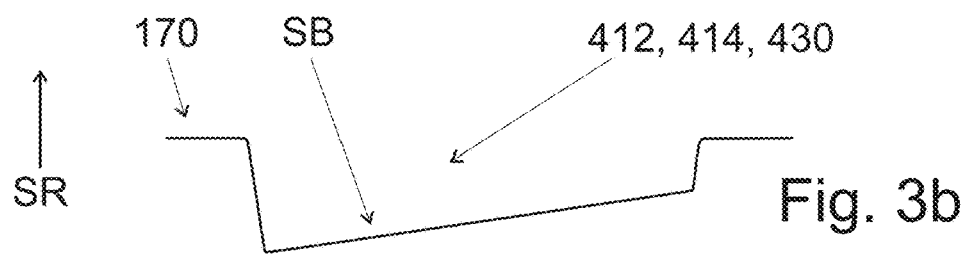
FIG. 3b shows a sipe having a flat bottom, which is inclined.
Figure 3C:
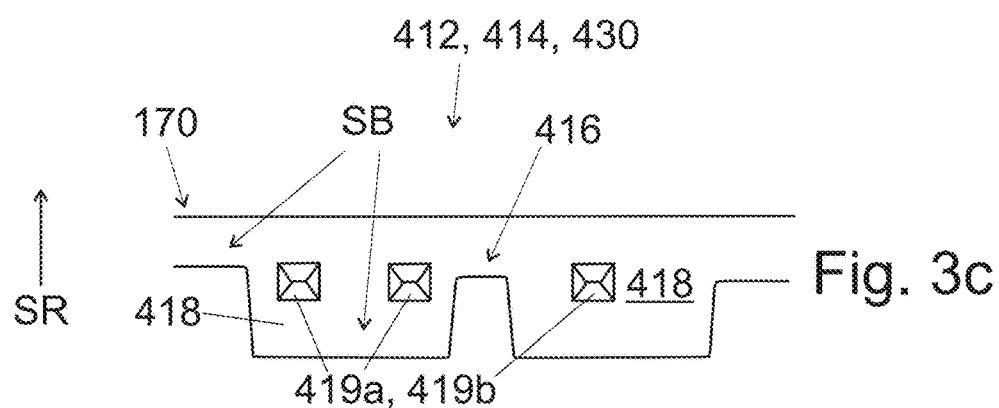
FIG. 3c shows a part of a sipe having two deep parts separated by a shallow part and a locking protrusion.
Figure 3D:
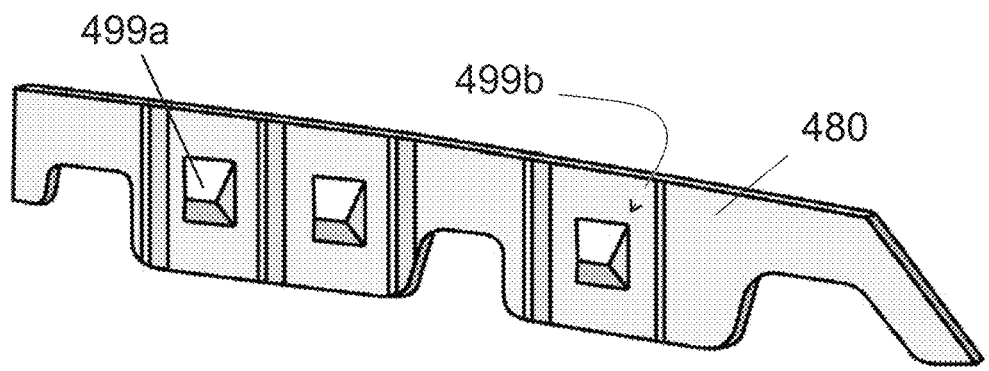
FIG. 3d shows a lamella plate for forming the sipe of FIG. 3c.

The second primary or second secondary sipe 412, 412b, which is a sipe neighbouring the first primary or first secondary sipe 420, 420b may be a traditional sipe. The second primary sipe 412 may have an even bottom SB. A sipe with an even bottom SB is indicated in FIG. 3a. The bottom SB may be inclined, as indicated in FIG. 3b. However, it has been noticed that a shallow part in between two deep parts does not make the lamellas significantly stiffer, at least when the depth of the shallow part is reasonably large compared to the depth of the deep part. Thus, in an embodiment, the second primary sipe 412 comprises exactly two deep parts 418 separated by a shallow part 416, as indicated in FIG. 3c. Thus, in an embodiment, the second primary sipe 412 comprises at least two deep parts 418 separated by a shallow part 416, as indicated in FIG. 3c. Moreover, in an embodiment, a depth of the second primary sipe 412 is, also in the shallow parts, more than 2 mm. Alternatively of in addition, a depth of the shallow part 416 may be more than one third of a depth of the deep part 418. If stiffness is needed also at a location of the second (primary or secondary) sipe 412, 412b, the shallow part 416 may be as shallow as discussed above for the first (primary or secondary) sipe 420, 420b. Thus, in an embodiment, the second primary sipe 412 has an even bottom SB or comprises deep parts 418 separated by shallow parts 416, wherein a depth of the shallow parts is more than 2 mm, such as at least 3 mm. FIG. 3d shows a lamella plate 480 for forming a second primary sipe 412, a second secondary sipe 412b, a third primary sipe 414, or a third secondary sipe 414b, a part of which is shown in FIG. 3c.

Similar considerations apply also to the third primary sipe 414. Thus, in an embodiment, the third primary sipe 414 has an even bottom SB or comprises deep parts 418 separated by shallow parts 416, wherein a depth of the shallow parts is at least 2 mm, such as at least 3 mm. Similar considerations apply also to the second secondary sipe 412b and the third secondary sipe 414b.

As for further details of the shape of the second primary sipe 412 (and also the third primary sipe 414), referring to FIGS. 2a, 3c, and 3d, in an embodiment, the second primary sipe 412 comprises a locking protrusion 419a and a locking depression 419b configured to lock neighbouring lamellas of the second primary sipe 412 to each other. The locking protrusion 419a is arranged on a first sidewall of the second primary sipe 412 and the locking depression 419b is arranged on a second, opposite, sidewall of the second primary sipe 412. FIG. 3d shows a lamella plate 480, by which such a locking protrusion and locking depression can be formed. As obvious from FIG. 3d, a height of the locking protrusion 419a is less than a depth of the second primary sipe 412. Wherein the depth of the sipe 412 refers to the depth at the longitudinal position of the locking protrusion 419a, and the height and depth refer to a dimension in the radial direction SR, or substantially radial direction along a side wall of the sipe, if the side walls of the sipe 412 are inclined relative to the radial direction SR. Moreover, a height of the locking depression 419b is less than a depth of the second primary sipe 412. Typically, the locking protrusion 419a is geometrically congruent with the locking depression 419b. Such a locking protrusion 419a and the locking depression 419b are arranged to lock neighbouring lamellas of the second primary sipe 412 to each other in both a radial direction SR (see FIG. 1a) and a longitudinal direction LS (see FIG. 2d) of the second primary sipe 412.

In such an embodiment, the neighbouring lamellas of the second primary sipe 412 are locked to each other by the locking protrusion 419a fitting into the locking depression 419b. FIG. 3d shows a lamella plate 480, by which such a sipe 412 can be produced. The protrusion 499a of the lamella plate 480 forms the depression 419b into a sidewall of the second primary sipe 412. Correspondingly, a depression 499b of the lamella plate 480, which is arranged on an opposite side of the lamella plate 480, will form the aforementioned locking protrusion 419a. The locking of the neighbouring lamellas is particularly efficient, when the first primary sipe 420 comprises the shallow parts 422 as discussed above. Sidewalls of a second or third primary or secondary sipe 412, 412b, 414, 414b may comprise such protrusions or depressions 419a, 419b.

In addition, or as an alternative, a zig-zag form helps to lock the side walls of a second or third primary or secondary sipe 412, 412b, 414, 414b to each other. Therefore, in addition to, or as an alternative to the locking protrusion 419a and the locking depression 419b, the second primary sipe 412 (and/or a sipe 412b, 414, 414b) may form a zig-zag, when viewed from top. Such a zig-zag helps to lock the side walls of a sipe 412, 412b, 414, 414b at least in an average longitudinal direction LSa. An example of a lamella plate 482 for forming a sipe having a shape of a zig-zag is depicted in FIGS. 5, 2i1, and 2i2.

Thus, when the primary shoulder block comprises the second primary sipe 412, preferably the second primary sipe 412 [A] comprises a locking protrusion 419a and a locking depression 419b configured to lock the lamellas neighbouring the second primary sipe 412 or the third primary sipe 414 and/or [B] when viewed from top, forms a zig-zag. Referring to FIG. 2a, when the primary shoulder block comprises both the second primary sipe 412 and the third primary sipe 414, preferably each one of the second primary 412 and the third primary 414 sipes [A] comprises a locking protrusion 419a and a locking depression 419b configured to lock the lamellas neighbouring the second primary sipe 412 or the third primary sipe 414 and/or [B] when viewed from top, forms a zig-zag.

Referring to FIG. 2a, when the tire comprises a secondary shoulder block comprising the first secondary sipe 420b and the second secondary sipe 412b, preferably the second secondary sipe 412b [A] comprises a locking protrusion 419a and a locking depression 419b configured to lock the lamellas neighbouring the second secondary sipe 412b and/or [B] when viewed from top, forms a zig-zag. Furthermore, when the secondary shoulder block comprises both the second secondary sipe 412b and the third secondary sipe 414b, preferably each one of the second secondary 412b and the third secondary 414b sipes [A] comprises a locking protrusion 419a and a locking depression 419b configured to lock the lamellas neighbouring the second secondary sipe 412b or the third secondary sipe 414b and/or [B] when viewed from top, forms a zig-zag.

Such an arrangement of sipes can be used in any suitable tread block arrangement. In particular, such an arrangement of sipes can be used with a tread block arrangement as detailed in an European patent application EP17397527.7, incorporated herein by reference. As indicated in that application, and with reference to FIG. 7, in an embodiment, a part of a tread 170 is formed by a tread block arrangement 200 comprising: a middle block 210 extending through the tread block arrangement 200 in the longitudinal or circumferential direction SC, SL; a first primary transversal block or block part 212 such that at least a part of a primary shoulder block 220, 222, 224 is arranged in the transversal direction ST, AX in between a part of the first primary transversal block or block part 212 and the primary boundary B1; a second primary transversal block or block part 214; and a primary intermediate block or block part 230.

As indicated above, each block 210, 220 of the tread block arrangement 200 is separated from another block 210, 220 of the tread block arrangement 200 by a portion of a groove pattern 310.

Figure 7:
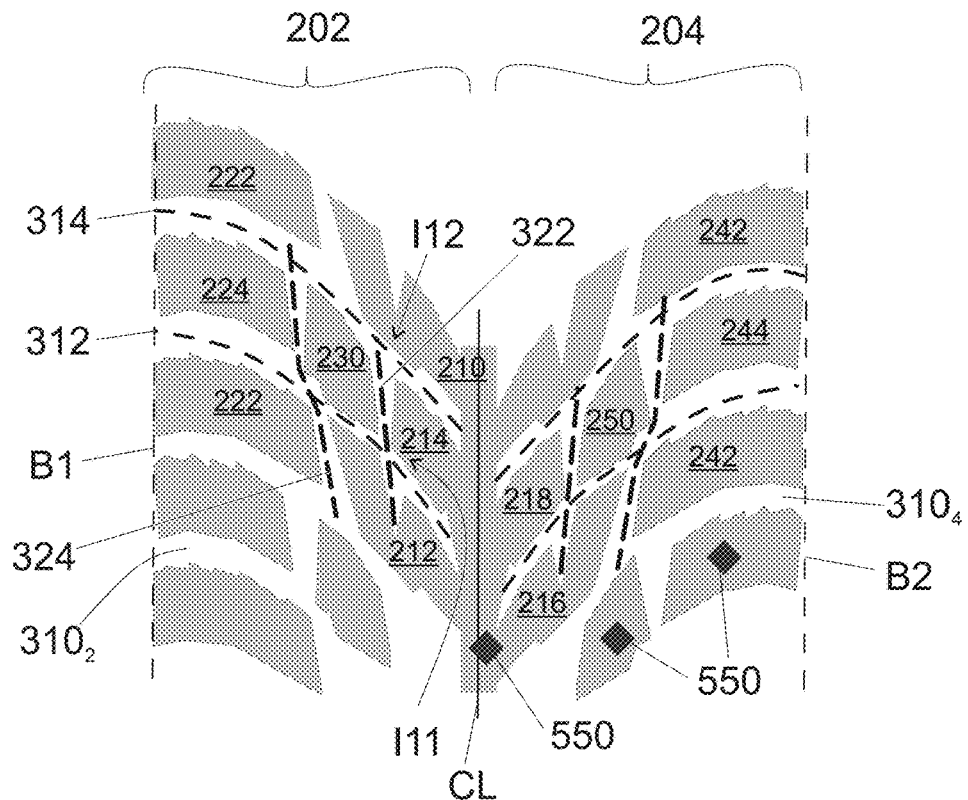
FIG. 7 shows, as a top view, a tread block arrangement that limits grooves.

Referring to FIG. 7, an embodiment of the tread block arrangement 200 comprises a first secondary transversal block or block part 216; a second secondary transversal block or block part 218; and a secondary intermediate block or block part 250. As evident from FIGS. 2a and 7, in an embodiment, the central part CP of the tread block arrangement is constituted by the primary and secondary intermediate blocks 230, 250, the first and second primary and secondary block parts 212, 214, 216, and 218; and other parts of the middle block 210. Moreover, in an embodiment, the first and second primary and secondary block parts 212, 214, 216, and 218 are parts of the middle block 210, i.e. they are not separated from each other, in particular the middle block 210, by a part of the groove pattern 310 (see FIGS. 6a and 8). However, in an embodiment, the primary and secondary intermediate blocks 230, 250 are blocks, i.e. separated from the middle block 210 by a part of the groove pattern 310.

Referring to FIGS. 6a and 6c, in an embodiment, at least one of: the middle block 210, a first primary transversal block or block part 212; a second primary transversal block or block part 214; and a primary intermediate block or block part 230 comprises sipe 430, 440 or sipes 430, 440. In what follows, preferable characteristics particularly suitable for sipes (230, 240) of the middle block 210 and sipes 230 for the intermediate blocks 230, 250 will be discussed.

Figure 4A:
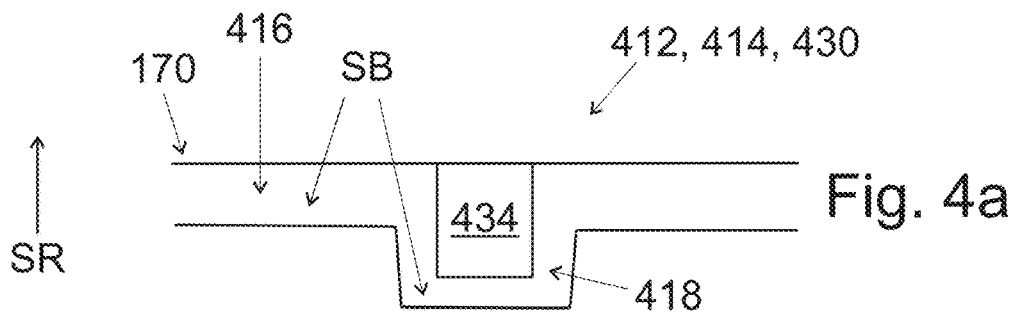
FIG. 4a shows, as a side view, a part of a sipe having one deep and wide part in between two shallow and narrow parts.
Figure 4B:
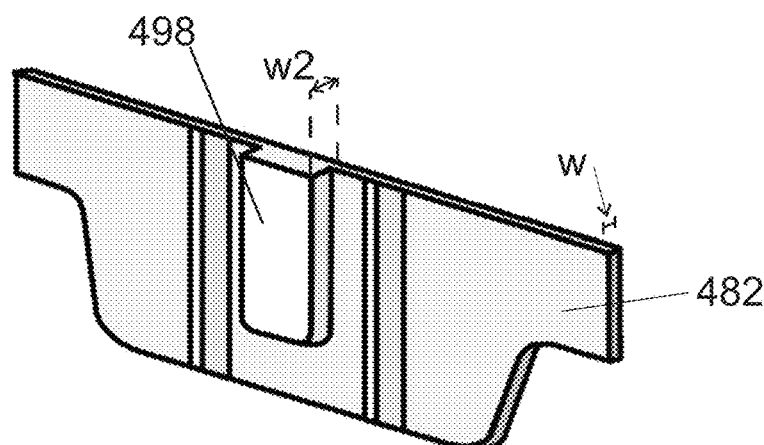
FIG. 4b shows a lamella plate for manufacturing the sipe of FIG. 4a, FIG. 4c shows, as a top view, the sipe of FIG. 4a, FIG. 5 shows a lamella plate for manufacturing a sipe with five deflection points of which two have an acute deflection angle.
Figure 4C:
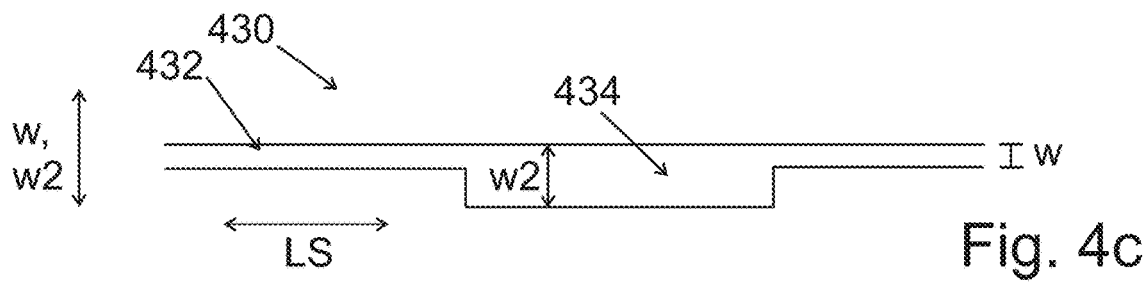

As indicated in FIGS. 6a, 4a, 4b, and 4c, preferably, at least some of: the middle block 210, the first primary transversal block or block parts 212; the second primary transversal block or block parts 214; and the primary intermediate block or block parts 230 comprise a sipe 430 that has one wide part 434 in between two narrow parts 432. Herein the term in between refers to being in between in the longitudinal direction LS of the sipe 430. The width refers to the width, as seen from above, i.e. from a radial direction SR. A width w2 of the wide part 434 may be at least two times the width w of one of the two narrow parts 432. Such a sipe 430 is indicated in detail in FIG. 4c, as seen from top. FIG. 4b shows a corresponding lamella plate 482. The lamella plate 482 of FIG. 4b includes a thick portion 498 in between two thinner portions. As for the sipe 430, the wide part 434 opens to the tread 170. In other words, when viewed from top, the sipe 430 comprises a wide part 434 in between two narrow parts 432. This has the effect that water can reasonably freely flow into the cavity formed by the wide part 434. Such a sipe 430 is preferably provided to at least a primary intermediate block 230. Such a sipe 430 may be provided to at least a secondary intermediate block 250. In addition or alternatively, such a sipe 430 may be provided to at least some of the first primary transversal block or block parts 212; the second primary transversal block or block parts 214; first secondary transversal block or block parts 216; and the second secondary transversal block or block parts 218.

Figure 5:
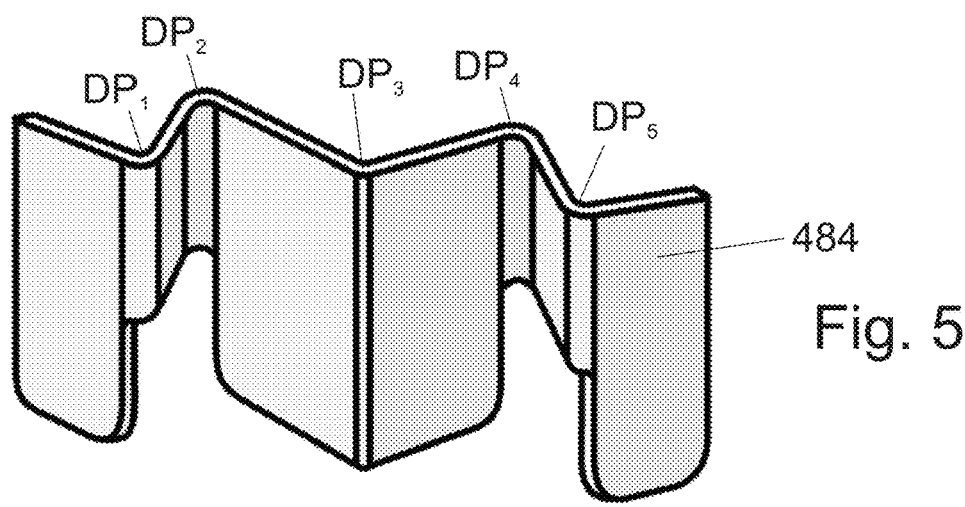

Referring to FIGS. 6a and 6c, in an embodiment, the middle block 210 is provided (or further provided) with sipes 440 that are configured to lock the lamellas neighboring the sipe 440 in the transversal direction ST, AX. FIG. 5 shows a lamella plate 484 that can be used to form such a sipe 440. As shown in the FIGS. 5, 6a, and 6c, when viewed from above, the sipe 440 has five deflection points $DP_i$, wherein i=1, 2, 3, 4, or 5, of which two (corresponding to i=2 or 4) have an acute deflection angle. An acute deflection angle is an angle of less than 90 degrees. The acute deflection angle may be e.g. less than 75 degrees. The sipe 440 may comprise deflection points $DP_i$, of which at least two have an angle of less than 90 degrees or less than 75 degrees.

As indicated in FIGS. 5 and 6c, the deflection angles of the sipe 440 second furthest away from its centre have an acute deflection angle. A similar technical effect is achieved, when the sipe 440 comprises at least four deflection points, of which at least four have an acute deflection angle. For example, also the deflection angles corresponding to deflection points $DP_1$ and $DP_5$ could have be acute. Furthermore, the deflection angle of the deflection point $DP_3$ could be 180 degrees, whereby the sipe 440 would lack the corresponding angle. A reasonably good transversal locking is obtained, when the sipe 440 comprises at least two acute deflection angles. Preferably, such a deflection point of the sipe 440 that has a right or an obtuse deflection angle (i.e. at least 90 degrees) is provided in between two deflection points with an acute angle. Such a sipe 440 has been found to provide good locking of the neighbouring lamellas in particular in terms of side grip. Thus, the middle block 210 is preferably provided with such sipes 440. As indicated in FIGS. 6a and 6c, preferably, at least some of the sipes 440 are provided such that, for each sipe 440 in question, a part of the sipe 440 is arranged on a first side of a central line CL of the tread 170 and a part of the sipe 440 is arranged on a second side of the central line CL of the tread 170.

As indicated in the aforementioned application EP17397527.7, the grip and handling properties can also be improved by designing the groove pattern 310 in such a way that it improves the drainage of water and/or slush from underneath the tire, when in use. Referring to FIGS. 6a and 7, in an embodiment, tread blocks or block parts 222, 224, 210, 212, 214, 230 limit the groove pattern 310. The groove pattern 310 comprises: a first primary longitudinal groove 322; a first primary transversal groove 312 extending from the primary boundary B1 towards the central line CL of the tread block arrangement 200; and a second primary transversal groove 314 extending from the primary boundary B1 towards the central line CL of the tread block arrangement 200. In the embodiment, the first primary transversal block or block part 212 forms a part of a side wall of the first primary transversal groove 312; and the second primary transversal block or block part 214 forms a part of another side wall of the first primary transversal groove 312. Moreover, the first primary longitudinal groove 322 extends from a first primary intersection I11 to a second primary intersection I12. Herein the first primary intersection I11 is an intersection of the first primary longitudinal groove 322 and the first primary transversal groove 312. Herein the second primary intersection I12 is an intersection of the first primary longitudinal groove 322 and the second primary transversal groove 314.

Such a groove pattern 310 enhances the drainage of water and/or slush, as indicated above. In an embodiment, the groove pattern 310 further comprises a second primary longitudinal groove 324.

Figure 8:
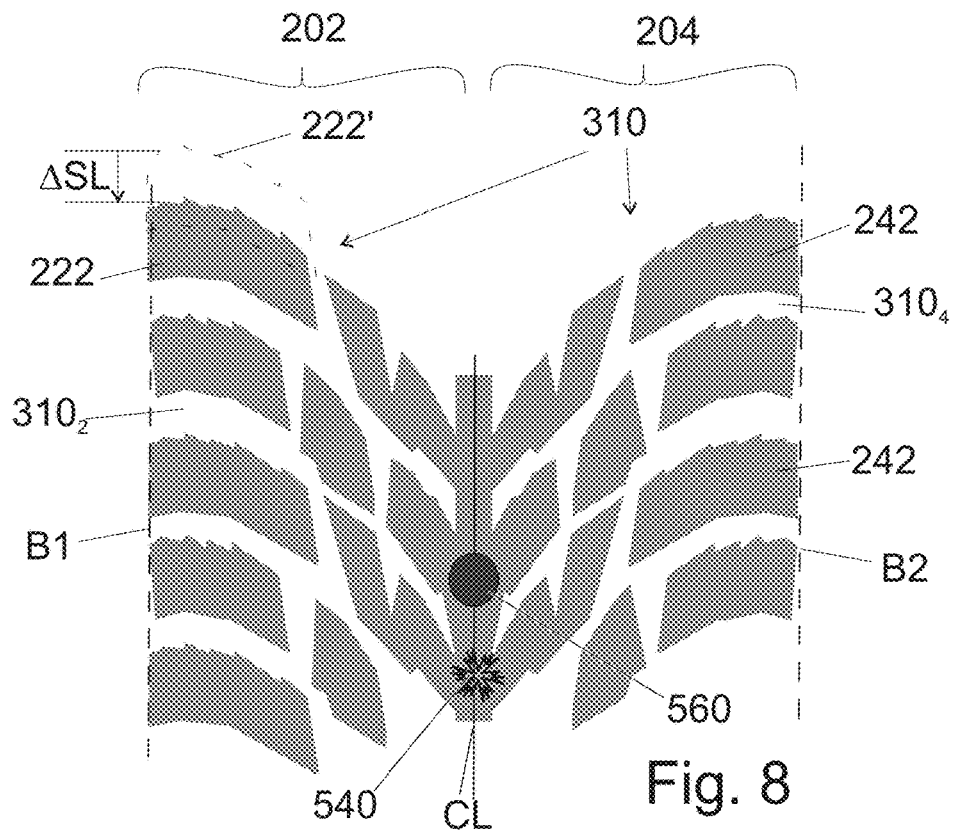
FIG. 8 shows, as a top view, a symmetric tread block arrangement that limits grooves.

Referring to FIGS. 6a, 7, and 8, in an embodiment, the tread block arrangement 200 comprises a primary part 202 and a secondary part 204.

The primary part 202 refers to that part of tread block arrangement 200 that is left in between the longitudinal central line CL and a primary boundary B1. The secondary part 204 refers to that part of tread block arrangement 200 that is left in between the longitudinal central line CL and a secondary boundary B2.

Referring to FIG. 8, in an embodiment, the groove pattern 310 is reflective symmetric about the central line CL. In other words, the secondary portion 3104 of the groove pattern 310 is a mirror image of the primary portion 3102 of the groove pattern 310.

However, as indicated in other figures, preferably the groove pattern 310 is not reflective symmetric about the central line CL. Referring to FIGS. 6a, 6c, and 7, preferably, the secondary portion 3104 of the groove pattern 310 is a longitudinally transferred mirror image of the primary portion 3102 of the groove pattern 310. For example, by comparing the FIGS. 8 and 6a, the primary part 202 of the tread block arrangement of FIG. 8 has been longitudinally transferred a distance of ΔSL relative to FIG. 6a, considering that the first secondary shoulder blocks 242 are at the same locations in these Figs. This has been indicated in FIG. 8 by a dashed line 222', which indicates a position of a primary shoulder block 222 corresponding to the embodiment of FIG. 6a, when the first secondary shoulder blocks 242 are at the same locations in these Figs. Thus, ΔSL is the distance the primary shoulder block 222 of FIG. 6a has been moved in order to arrive at the reflective symmetric embodiment of FIG. 8. Moreover, since the groove pattern 310 of FIG. 5 is reflective symmetric about the central line CL, in FIG. 3a, the secondary portion 3104 of the groove pattern 310 is a longitudinally transferred mirror image of the primary portion 3102 of the groove pattern 310. This has the effect that the grip does not depend on the orientation of the tire relative to the ground surface 900. As the tire rotates, the primary shoulder blocks 220, 222, 224 and the secondary shoulder blocks 240, 242, 244 escape from the footprint subsequently, and not simultaneously. This makes the grip more uniform.

In a preferable embodiment, the tire 100, tread band 150, or the tread block arrangement 200 comprises a first marking 510 indicative of the direction of rotation R. In a preferable embodiment, the tire 100, tread band 150, or the tread block arrangement 200 comprises a second marking 520 indicative of the tire 100 being suitable for use as a winter tire. The tire 100, tread band 150, or the tread block arrangement 200 may comprise a third marking 530 indicative of a maximum driving speed for the tire 100. These markings are indicated in FIG. 1a, and are commonly arranged on a sidewall on the tire. In addition of alternatively, the tread block arrangement 200 may limit an indicator 540 indicative of depth of the groove pattern 310. The indicator 540 may also be indicative of the of the groove pattern 310 having a depth that is sufficient for driving on a snowy road. Such an indicator is illustrated in FIG. 8. Referring to FIG. 7, in an embodiment, the tread block arrangement 200 comprises a stud 550. Such studs 550 improve friction on icy roads. However, the tread 170 formed by the tread block arrangement is also applicable as a tread of a studless tire, such as a studless winter tire. As indicated above and in FIG. 8, the tread block arrangement 200 may comprise a pattern 560 indicative of the tread block arrangement 200 being not used.

The following examples summarize the tread block arrangements disclosed above.

1. A tread block arrangement (200) suitable for a tire (100) or for a tread band (150) for a tire (100), the tread block arrangement (200) comprising a tread block (220, 222, 224, 240, 242, 244, 230, 250, 210, 212, 214, 216, 218) that limits a first primary sipe (420), the first primary sipe (420) comprising at least a first deep part ($424_1$) and a second deep part ($424_2$) separated from the first deep part ($424_1$) by a first shallow part ($422_1$), wherein a depth ($d2_1$) of the first deep part ($424_1$) is at least three times a depth (d1) of the first shallow part ($422_1$), a depth ($d2_2$) of the second deep part ($424_2$) is at least three times the depth (d1) of the first shallow part ($422_1$), the first deep part ($424_1$) is limited in a longitudinal direction (LS) of the first primary sipe (420) by a primary first end wall ($E1_1$) and a secondary first end wall ($E2_1$) such that a first angle ($\alpha_1$) between the primary first end wall ($E1_1$) and the secondary first end wall ($E2_1$) is from 1 degree to 30 degrees and the second deep part ($424_2$) is limited in a longitudinal direction (LS) of the first primary sipe (420) by a primary second end wall ($E1_2$) and a secondary second end wall ($E2_2$) such that a second angle ($\alpha_2$) between the primary second end wall ($E1_2$) and the secondary second end wall ($E2_2$) is from 1 degree to 30 degrees.

2. The tread block arrangement (200) of the example 1, wherein a depth ($d2_1$) of the first deep part ($424_1$) is at least five times the depth (d1) of the first shallow part ($422_1$), and a depth ($d2_2$) of the second deep part ($424_2$) is at least five times the depth (d1) of the first shallow part ($422_1$).

3. The tread block arrangement (200) of the example 1 or 2, wherein a depth (d1) the first shallow part ($422_1$) is from 0.1 mm to 2.0 mm, preferably from 0.15 mm to 1.0 mm, a depth ($d2_1$) of the first deep part ($424_1$) is from 5 mm to 15 mm, and a depth ($d2_2$) of the second deep part ($424_2$) is from 5 mm to 15 mm; in an embodiment, a width (w) of a deep part ($424_1$, $424_2$) is at most 3 mm.

4. The tread block arrangement (200) of any of the examples 1 to 3, wherein the first shallow part ($422_1$) has a first primary length ($l_11$) on a level (LBS) of a bottom of the first shallow part ($422_1$), the first deep part ($424_1$) has a first secondary length ($l_12$) on a level of a bottom of such a shallow part ($422$, $422_1$) that is next to the first deep part ($424_1$), and the second deep part ($424_2$) has a second secondary length ($l_22$) on a level of a bottom of such a shallow part ($422$, $422_1$) that is next to the second deep part ($424_2$), wherein a ratio ($l_11/l_12$) of the first primary length ($l_11$) to the first secondary length ($l_12$) is from ⅓ to 3, such as from ½ to 2, and/or the first secondary length ($l_12$) is greater than the first primary length ($l_11$), and a ratio ($l_11/l_22$) of the first primary length ($l_11$) to the second secondary length ($l_22$) is from ⅓ to 3, such as from ½ to 2, and/or the second secondary length ($l_22$) is greater than the first primary length ($l_11$).

5. The tread block arrangement (200) of any of the examples 1 to 4, wherein
the first deep part (424$_1$) has a first secondary length ($l_12$) on a level of a bottom of such a shallow part (422, 422$_1$) that is next to the first deep part (424$_1$),
the second deep part (424$_2$) has a second secondary length ($l_22$) on a level of a bottom of such a shallow part (422, 422$_1$) that is next to the second deep part (424$_2$),
the first deep part (424$_1$) has a first tertiary length ($l_13$) as measured at a level (LBD) of a bottom of the first deep part (424$_1$), and
the second deep part (424$_2$) has a second tertiary length ($l_23$) as measured at a level of a bottom of the second deep part (424$_2$), wherein
a ratio ($l_13/l_12$) of the first tertiary ($l_13$) to the first secondary length ($l_12$) is at most 95%, at most 90% or at most 75% and
a ratio ($l_23/l_22$) of the second tertiary ($l_23$) to the second secondary length ($l_22$) is at most 95%, at most 90% or at most 75%.

6. The tread block arrangement (200) of any of the examples 1 to 5, wherein
when viewed from top, the first primary sipe (420) comprises at least two deflection points (DP) in such a way that the first primary sipe (420) forms a form of a zig-zag, optionally with rounded corners, as seen from top; preferably,
at least one of the deflection points (DP) is arranged at a location of the first shallow part (422$_1$).

7. The tread block arrangement (200) of any of the examples 1 to 6, wherein, when viewed from top,
the first primary sipe (420) extends
only straight in between the primary first end wall (E1$_1$) and the secondary first end wall (E2$_1$) and
only straight in between the primary second end wall (E1$_2$) and the secondary second end wall (E2$_2$);
in an embodiment,
when viewed from top, no deflection point (DP) of the first primary sipe (420) is arranged at a location of a deep part (424$_1$, 424$_2$).

8. The tread block arrangement (200) of any of the examples 1 to 7, wherein the first primary sipe (420) comprises
a third deep part (424$_3$) separated from the first deep part (424$_1$) or the second deep part (424$_2$) by a second shallow part (422$_2$), wherein
the third deep part (424$_3$) is limited in a longitudinal direction (LS) of the first primary sipe (420) by a primary third end wall (E1$_3$) and a secondary third end wall (E2$_3$) such that a third angle ($\alpha_3$) between the primary third end wall (E1$_3$) and the secondary third end wall (E2$_3$) is from 1 degree to 30 degrees.

9. The tread block arrangement (200) of any of the examples 1 to 8, wherein
a depth (d2$_1$) of the first deep part (424$_1$) is different from a depth (d2$_2$) of the second deep part (424$_2$).

10. The tread block arrangement (200) of any of the examples 1 to 9, wherein
the tread block arrangement (200) defines a primary boundary (B1) and a central line (CL),
a second shallow part (422$_2$) of the first primary sipe (420) is located closer to the primary boundary (B1) than the first shallow part (422$_1$),
the second shallow part (422$_2$) is located further away from the central line (CL) than the first shallow part (422$_1$),
the first shallow part (422$_1$) has a first primary length ($l_11$) on a level (LBS) of a bottom of the first shallow part (422$_1$),
the second shallow part (422$_2$) has a second primary length ($l_21$) on a level of a bottom of the second shallow part (422$_2$), and
the second primary length ($l_21$) is greater than the primary length ($l_11$);
preferably,
the tread block (220, 222, 224) that limits the first primary sipe (420) defines a part of a primary boundary (B1) of the tread block arrangement (200).

11. The tread block arrangement (200) of any of the examples 1 to 10, wherein
the tread block (220, 222, 224, 240, 242, 244, 230, 250, 210, 212, 214, 216, 218) further limits a second primary sipe (412), wherein
only one lamella is left in between the first primary sipe (420) and the second primary sipe (412);
preferably,
the second primary sipe (412) comprises a locking protrusion (419$a$) and a locking depression (419$b$) configured to lock neighbouring lamellas of the second primary sipe (412) to each other and/or
the second primary sipe (412), when viewed from top, forms a zig-zag.

12. The tread block arrangement (200) of the example 11, wherein
the tread block (220, 222, 224, 240, 242, 244, 230, 250, 210, 212, 214, 216, 218) further limits a third primary sipe (414), wherein
only one lamella is left in between the first primary sipe (420) and the third primary sipe (414), and
the first primary sipe (420) is left in between the second primary sipe (412) and the third primary sipe (414);
preferably,
the third primary sipe (414) comprises a locking protrusion (419$a$) and a locking depression (419$b$) configured to lock neighbouring lamellas of the third primary sipe (414) to each other and/or
the third primary sipe (414), when viewed from top, forms a zig-zag.

13. The tread block arrangement (200) of any of the examples 1 to 12, wherein
the tread block arrangement (200) defines a primary boundary (B1) such that
the tread block (220, 222, 224) defines a part of the primary boundary (B1).

14. The tread block arrangement (200) of any of the examples 1 to 13, comprising
a middle block (210) extending through the tread block arrangement (200) in a direction (SC, SL) that is perpendicular to a transversal direction (ST, AX) of the tread block arrangement (200) and perpendicular to the thickness (T) of the tread block arrangement (200) and
a primary intermediate block (230), the blocks defining a groove pattern (310) such that
each block (210, 220) of the tread block arrangement (200) is separated from another block (210, 220) of the tread block arrangement (200) by a portion of the groove pattern (310); wherein
[A]
the middle block (210) and/or the primary intermediate block (230), is provided with a sipe (440) or sipes (440)

comprising at least four deflection points (DP, DP$_1$, DP$_2$, DP$_3$, DP$_4$, DP$_5$), of which at least two have an acute deflection angle and/or

[B]

the middle block (210) and/or the primary intermediate block (230), is provided with such a sipe (430) or sipes (430) that have a wide part (434) in between two narrow parts (432).

15. The tread block arrangement (200) of any of the examples 1 to 14, wherein
    the central line (CL) divides the tread block arrangement (200) to a primary part (202) and a secondary part (204) such that
        the primary part (202) limits a primary portion (3102) of a groove pattern (310) and
        the secondary part (204) limits a secondary portion (3104) of the groove pattern (310), wherein
    the secondary portion (3104) of the groove pattern (310) is
        a longitudinally transferred mirror image of the primary portion (3102) of the groove pattern (310) or
        a mirror image of the primary portion (3102) of the groove pattern (310).

The invention claimed is:

1. A tread block arrangement suitable for a tire or for a tread band for a tire, the tread block arrangement comprising:
    a tread block that limits a first primary sipe, the first primary sipe comprising at least a first deep part and a second deep part separated from the first deep part by a first shallow part,
    wherein
    a depth of the first deep part is at least three times a depth of the first shallow part,
    a depth of the second deep part is at least three times the depth of the first shallow part,
    the tread block arrangement defines a primary boundary and a central line which is parallel to the primary boundary,
    a second shallow part of the first primary sipe is located closer to the primary boundary than the first shallow part,
    the second shallow part is located further away from the central line than the first shallow part,
    the first shallow part has a first primary length on a level of a bottom of the first shallow part, and
    the second shallow part has a second primary length on a level of a bottom of the second shallow part,
    wherein
    the second primary length is greater than the first primary length,
    the first deep part is limited in a longitudinal direction of the first primary sipe by a primary first end wall and a secondary first end wall such that a first angle between the primary first end wall and the secondary first end wall is from 1 degree to 30 degrees, and
    the second deep part is limited in a longitudinal direction of the first primary sipe by a primary second end wall and a secondary second end wall such that a second angle between the primary second end wall and the secondary second end wall is from 1 degree to 30 degrees.

2. The tread block arrangement of the claim 1, wherein the depth of the first deep part is at least five times the depth of the first shallow part, and
    the depth of the second deep part is at least five times the depth of the first shallow part.

3. The tread block arrangement of the claim 1, wherein the depth of the first shallow part is from 0.1 mm to 2.0 mm,
    the depth of the first deep part is from 5 mm to 15 mm, and
    the depth of the second deep part is from 5 mm to 15 mm.

4. The tread block arrangement of claim 1, wherein the first deep part has a first secondary length on a level of a bottom of such a shallow part that is next to the first deep part, and
    the second deep part has a second secondary length on a level of a bottom of such a shallow part that is next to the second deep part, wherein
    a ratio of the first primary length to the first secondary length is from 1/3 to 3, and/or the first secondary length is greater than the first primary length, and
    a ratio of the first primary length to the second secondary length is from 1/3 to 3, and/or the second secondary length is greater than the first primary length.

5. The tread block arrangement of claim 1, wherein the first deep part has a first secondary length on a level of a bottom of such a shallow part that is next to the first deep part,
    the second deep part has a second secondary length on a level of a bottom of such a shallow part that is next to the second deep part,
    the first deep part has a first tertiary length as measured at a level of a bottom of the first deep part, and
    the second deep part has a second tertiary length as measured at a level of a bottom of the second deep part, wherein
    a ratio of the first tertiary to the first secondary length is at most 95%, at most 90% or at most 75% and
    a ratio of the second tertiary to the second secondary length is at most 95%, at most 90% or at most 75%.

6. The tread block arrangement of claim 1, wherein when viewed from top, the first primary sipe comprises at least two deflection points in such a way that the first primary sipe forms a form of a zig-zag, optionally with rounded corners, as seen from top.

7. The tread block arrangement of claim 1, wherein, when viewed from top,
    the first primary sipe extends
        only straight in between the primary first end wall and the secondary first end wall and
        only straight in between the primary second end wall and the secondary second end wall.

8. The tread block arrangement of claim 1, wherein the first primary sipe comprises:
    a third deep part separated from the first deep part or the second deep part by a second shallow part, wherein
    the third deep part is limited in a longitudinal direction of the first primary sipe by a primary third end wall and a secondary third end wall such that a third angle between the primary third end wall and the secondary third end wall is from 1 degree to 30 degrees.

9. The tread block arrangement of claim 1, wherein the depth of the first deep part is different from the depth of the second deep part.

10. The tread block arrangement of claim 1, wherein the tread block that limits the first primary sipe defines a part of the primary boundary of the tread block arrangement.

11. The tread block arrangement of claim 1, wherein the tread block further limits a second primary sipe, wherein only one lamella is left in between the first primary sipe and the second primary sipe.

12. The tread block arrangement of the claim 11, wherein the tread block further limits a third primary sipe, wherein only one lamella is left in between the first primary sipe and the third primary sipe, and the first primary sipe is left in between the second primary sipe and the third primary sipe.

13. The tread block arrangement of claim 1, wherein the tread block defines a part of the primary boundary.

14. The tread block arrangement of claim 1, further comprising:

a middle block extending through the tread block arrangement in a direction that is perpendicular to a transversal direction of the tread block arrangement and perpendicular to the thickness of the tread block arrangement and a primary intermediate block, the tread block, the middle block and the primary intermediate blocks of the tread block arrangement defining a groove pattern such that each block of the tread block arrangement is separated from another block of the tread block arrangement by a portion of the groove pattern; wherein

[A]

the middle block and/or the primary intermediate block, is provided with a sipe or sipes comprising at least four deflection points, of which at least two have an acute deflection angle and/or

[B]

the middle block and/or the primary intermediate block, is provided with such a sipe or sipes that have a wide part in between two narrow parts.

15. The tread block arrangement of claim 1, wherein the central line divides the tread block arrangement to a primary part of the tread block arrangement and a secondary part of the tread block arrangement such that the primary part of the tread block arrangement limits a primary portion of a groove pattern and the secondary part of the tread block arrangement limits a secondary portion of the groove pattern, wherein the secondary portion of the groove pattern is a longitudinally transferred mirror image of the primary portion of the groove pattern or a mirror image of the primary portion of the groove pattern.

16. The tread block arrangement of claim 6, wherein at least one of the deflection points is arranged at a location of the first shallow part.

17. The tread block arrangement of claim 11, wherein the second primary sipe comprises a locking protrusion and a locking depression configured to lock neighbouring lamellas of the second primary sipe to each other.

18. The tread block arrangement of claim 11, wherein the second primary sipe, when viewed from top, forms a zig-zag.

* * * * *